US012756189B2

(12) United States Patent
Shao et al.

(10) Patent No.: US 12,756,189 B2
(45) Date of Patent: Oct. 6, 2026

(54) POWER SUPPLY SYSTEM AND CONVERSION METHOD

(71) Applicant: Huawei Digital Power Technologies Co., Ltd., Shenzhen (CN)

(72) Inventors: Zhangping Shao, Shanghai (CN); Kai Xin, Shanghai (CN); Congyuan Wang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 458 days.

(21) Appl. No.: 18/395,643

(22) Filed: Dec. 25, 2023

(65) Prior Publication Data

US 2024/0136815 A1 Apr. 25, 2024

Related U.S. Application Data

(63) Continuation of application No. PCT/CN2021/134642, filed on Nov. 30, 2021.

(51) Int. Cl.
*H02J 3/00* (2026.01)
*H02J 3/001* (2026.01)
(Continued)

(52) U.S. Cl.
CPC ........ *H02J 3/00125* (2020.01); *H02J 3/0012* (2020.01); *H02J 3/0014* (2026.01);
(Continued)

(58) Field of Classification Search
CPC .... H02J 3/00125; H02J 3/0012; H02J 3/0014; H02J 3/01; H02J 3/16; H02J 2101/24;
(Continued)

(56) References Cited

U.S. PATENT DOCUMENTS 11,362,539 B1 * 6/2022 Alam ...................... H02J 3/381
2015/0361954 A1 12/2015 Nelson et al.
(Continued)

FOREIGN PATENT DOCUMENTS

CN 104578151 A 4/2015
CN 105914778 A 8/2016
(Continued)

OTHER PUBLICATIONS

FGW Part4 Rev9, Technical Guidelines for Power Generating Units and Systems, Part 4 (TG 4) Demands on Modelling and Validating Simulation Models of the Electrical Characteristics of Power Generating Units and Systems, Storage Systems as well as their Components, Revision 09, Dated Jan. 2, 2019, total 28 pages.

*Primary Examiner* — Christopher W Carter

(57) ABSTRACT

This application provides a power supply system and a conversion method. The power supply system includes a power generation apparatus, a converter circuit, and a drive control circuit. The drive control circuit may be configured to: when a power grid fails, control, based on duration of previous low voltage ride-through, the converter circuit to increase a value of a current to be output to the power grid from a first operating current value to a low voltage ride-through current value, to increase a voltage value at an output end of the converter circuit. Herein, the previous low voltage ride-through is latest low voltage ride-through. In this application, the system can control, based on duration of previous voltage ride-through, a current to be output by the converter circuit to the power grid, to reduce circuit oscillation, with a simple structure, a simple control method, and high safety.

20 Claims, 10 Drawing Sheets

(51) Int. Cl.

| | |
|---|---|
| ***H02J 3/0012*** | (2026.01) |
| ***H02J 3/0014*** | (2026.01) |
| ***H02J 3/01*** | (2006.01) |
| ***H02J 3/16*** | (2006.01) |
| *H02J 101/24* | (2026.01) |

(52) U.S. Cl.
CPC *H02J 3/01* (2013.01); *H02J 3/16* (2013.01); *H02J 2101/24* (2026.01)

(58) Field of Classification Search
CPC ............... H02J 2101/10; H02J 2101/20; H02J 2101/28; H02J 3/001; H02J 3/381; H02H 7/1227
See application file for complete search history.

(56) References Cited

U.S. PATENT DOCUMENTS

| | | | | |
|---|---|---|---|---|
| 2018/0367074 | A1* | 12/2018 | Spyra | F02D 29/06 |
| 2019/0173420 | A1* | 6/2019 | Ni | H02J 3/381 |
| 2021/0143642 | A1* | 5/2021 | Gupta | H02J 3/381 |
| 2021/0320601 | A1* | 10/2021 | Wagoner | F03D 9/255 |
| 2022/0077797 | A1* | 3/2022 | Achilles | H02J 3/001 |

FOREIGN PATENT DOCUMENTS

| | | | |
|---|---|---|---|
| CN | 106684852 | A | 5/2017 |
| CN | 106921177 | A | 7/2017 |
| CN | 109378860 | A | 2/2019 |
| CN | 110098640 | A | 8/2019 |

* cited by examiner

POWER SUPPLY SYSTEM AND CONVERSION METHOD

CROSS-REFERENCE TO RELATED APPLICATIONS

This application is a continuation of International Application No. PCT/CN2021/134642, filed on Nov. 30, 2021, the disclosure of which is hereby incorporated by reference in its entirety.

TECHNICAL FIELD

This application relates to the field of electronic power technologies, and in particular, to a power supply system and a conversion method.

BACKGROUND

A power supply system usually includes a photovoltaic power supply system, a wind power supply system, and the like. Different types of power supply systems have different types of power generation apparatuses. Currently, in various types of power supply systems, a power generation apparatus of the power supply system is usually connected to a power grid through a converter. When a voltage at an output end of the converter in the power supply system changes due to a failure of the power grid, the converter in the power supply system may adjust a current at the output end of the converter, to adjust a voltage transmitted by the converter to the power grid, so as to maintain operation of the power grid. For example, when a voltage transmitted by the output end of the converter to the power grid decreases due to an inductive short circuit to ground in the power grid, the converter may perform low voltage ride-through (to be specific, the converter may increase an output reactive current to increase/decrease the voltage at the output end of the converter), to ensure that the output end of the converter transmits a sufficiently large voltage to the power grid to maintain operation of the power grid. However, in the power supply system, if resistance of the connected power grid is large, when the power grid fails, the reactive current output by the converter increases due to the large resistance of the power grid, and therefore the voltage transmitted by the output end of the converter to the power grid significantly increases. Therefore, the converter stops outputting (or decreases) the reactive current before the failure of the power grid is rectified, and the voltage transmitted by the output end of the converter to the power grid decreases again. Consequently, the converter repeatedly outputs (or increases) and stops outputting (or decreases) the reactive current, causing poor stability and low safety of the power supply system. In some power supply systems, the power supply system may determine, based on a magnitude of impedance of a power grid, a magnitude of a reactive current provided when a converter performs low voltage ride-through. However, impedance of the power grid at different locations (for example, different grid-tied points) varies greatly. Therefore, in this method, impedance of the power grid at each grid-tied point needs to be obtained in real time before calculation, causing complex operations, low detection precision, and high costs.

SUMMARY

This application provides a power supply system and a conversion method, to control, based on duration of previous voltage ride-through, a current to be output by a converter circuit to a power grid, so as to reduce circuit oscillation, with a simple structure, a simple control method, and high safety.

According to a first aspect, this application provides a power supply system. The power supply system includes a power generation apparatus, a converter circuit, and a drive control circuit. Herein, the power generation apparatus may be connected to an input end of the converter circuit, an output end of the converter circuit may be connected to a power grid, and the drive control circuit may be connected to the converter circuit. Herein, the drive control circuit may be configured to: when the power grid fails, control, based on duration of previous low voltage ride-through, the converter circuit to increase a value of a current to be output to the power grid from a first operating current value to a low voltage ride-through current value, so as to increase a voltage value at the output end of the converter circuit. Herein, the previous low voltage ride-through is latest low voltage ride-through. It can be understood that, when the power supply system transmits electric energy to the power grid, some failures may occur in the power grid (for example, an inductive short circuit to ground occurs in a part of the power grid (for example, some transmission cables or other elements)), causing a voltage drop at the output end of the converter circuit. When the voltage value at the output end of the converter circuit decreases to be less than a specific threshold, the converter circuit may increase an output reactive current (for example, increase the value of the current to be output to the power grid from the first operating current value to the low voltage ride-through current value), to increase the voltage value at the output end of the converter circuit to a voltage value capable of maintaining operation of the power grid. This process may be referred to as a low voltage ride-through process. In this case, the drive control circuit may control, based on the duration of the previous low voltage ride-through (to be specific, duration of previous low voltage ride-through performed by the power supply system before a current moment), the converter circuit to increase the value of the current to be output to the power grid from the first operating current value to the low voltage ride-through current value, so as to increase the voltage value at the output end of the converter circuit. Herein, the previous low voltage ride-through is latest low voltage ride-through. The power supply system may control, based on the duration of the previous low voltage ride-through, the current to be output by the converter circuit to the power grid, to reduce circuit oscillation, with a simple structure, a simple control method, and high safety.

With reference to the first aspect, in a first possible implementation, the drive control circuit may be further configured to: when the power grid fails and the duration of the previous low voltage ride-through is greater than or equal to a low voltage ride-through time threshold, control the converter circuit to increase the value of the current to be output to the power grid from the first operating current value to a first low voltage ride-through current value, so as to increase the voltage value at the output end of the converter circuit. It can be understood that, if the power grid fails at a current moment, and duration of previous low voltage ride-through performed by the power supply system before the current moment is greater than or equal to a specific threshold (for example, the low voltage ride-through time threshold), the drive control circuit may control the value of the current to be output by the converter circuit to be the first low voltage ride-through current value, so that the system can perform stable low voltage ride-through. Herein, the first low voltage ride-through current value may be a current value obtained by the system in advance or in real time, or may be a current value calculated by the system based on a current system parameter (for example, an operating voltage at the output end of the converter circuit, an operating current at the output end of the converter circuit, a rated voltage at the output end of the converter circuit, or a rated current at the output end of the converter circuit), or may be a current value defined by a user or a manufacturer in advance or in real time, or may be a current value determined based on a current value at the output end of the converter circuit during the previous low voltage ride-through. It can be understood that a magnitude of a reactive current output by the converter circuit under the control of the drive control circuit may match impedance of the power grid during the previous low voltage ride-through. This prevents a voltage at the output end of the converter circuit from increasing to an excessively high level, and the system does not stop performing low voltage ride-through due to misjudgment and therefore the voltage at the output end of the voltage converter circuit does not decrease again (for example, decrease to a voltage that indicates a failure of the power grid). If the duration of the previous low voltage ride-through is greater than or equal to a specific threshold (for example, the low voltage ride-through time threshold), it can be considered that the previous low voltage ride-through is stable. In other words, during low voltage ride-through of this time, the drive control circuit may control the value of the current to be output by the converter circuit to be the first low voltage ride-through current value, so that the power supply system performs low voltage ride-through. It can be understood that, in this case, a magnitude of a reactive current output by the converter circuit matches impedance of the power grid, so that a voltage at the output end of the converter circuit does not increase to an excessively high level. In addition, the system is prevented from stopping performing low voltage ride-through due to misjudgment, and therefore the voltage at the output end of the voltage converter circuit does not decrease again. That is, during the low voltage ride-through of this time, the drive control circuit may control the value of the current to be output by the converter circuit to be the first low voltage ride-through current value, so that the power supply system can perform stable low voltage ride-through, to reduce circuit oscillation, with a simple structure, a simple control method, a timely response, high safety, and high operation efficiency.

With reference to the first possible implementation of the first aspect, in a second possible implementation, the drive control circuit may be further configured to: when the power grid fails and the duration of the previous low voltage ride-through is less than the low voltage ride-through time threshold, control the converter circuit to increase the value of the current to be output to the power grid from the first operating current value to a second low voltage ride-through current value, so as to increase the voltage value at the output end of the converter circuit. Herein, the second low voltage ride-through current value is less than the first low voltage ride-through current value. It can be understood that, if the power grid fails at a current moment, and duration of previous low voltage ride-through performed by the power supply system before the current moment is less than a specific threshold (for example, the low voltage ride-through time threshold), the drive control circuit may control the value of the current to be output by the converter circuit to be the second low voltage ride-through current value, so that the system can perform stable low voltage ride-through. Herein, the second low voltage ride-through current value is less than the first low voltage ride-through current value. Herein, the second low voltage ride-through current value may be a current value that is obtained by the system in advance or in real time and that is less than the first low voltage ride-through current value, or may be a current value that is calculated or obtained by the system based on a current parameter (for example, an operating voltage at the output end of the converter circuit, an operating current at the output end of the converter circuit, a rated voltage at the output end of the converter circuit, or a rated current at the output end of the converter circuit) and that is less than the first low voltage ride-through current value, or may be a current value that is defined by a user or a manufacturer in advance or in real time and that is less than the first low voltage ride-through current value, or may be a current value that is determined based on a current value at the output end of the converter circuit during the previous low voltage ride-through and that is less than the first low voltage ride-through current value. It can be understood that a magnitude of a reactive current output by the converter circuit under the control of the drive control circuit may not match impedance of the power grid during the previous low voltage ride-through. As a result, a voltage at the output end of the converter circuit may increase to an excessively high level. Further, the system stops performing low voltage ride-through due to misjudgment, and therefore the voltage at the output end of the voltage converter circuit decreases again (for example, decreases to a voltage that indicates a failure of the power grid). Consequently, the duration of the previous low voltage ride-through is less than a specific threshold (for example, the low voltage ride-through time threshold). In other words, during the low voltage ride-through of this time, the drive control circuit may control the value of the current to be output by the converter circuit to be the second low voltage ride-through current value, so that the power supply system performs stable low voltage ride-through. Further, it can be understood that, in this case, a magnitude (for example, the second low voltage ride-through current value) of a reactive current output by the converter circuit matches impedance of the power grid, so that a voltage at the output end of the converter circuit does not increase to an excessively high level. In addition, the system is prevented from stopping performing low voltage ride-through due to misjudgment, and therefore the voltage at the output end of the voltage converter circuit does not decrease again. That is, during the low voltage ride-through of this time, the drive control circuit may control the value of the current to be output by the converter circuit to be the second low voltage ride-through current value, so that the power supply system can perform stable low voltage ride-through, to reduce circuit oscillation, with a simple structure, a simple control method, a timely response, high safety, and high operation efficiency.

With reference to any one of the first aspect to the second possible implementation of the first aspect, in a third possible implementation, the converter circuit may be configured to determine that the power grid fails when it is detected that the voltage value at the output end of the converter circuit decreases from a first operating voltage value to a second operating voltage value, and the second operating voltage value is less than a first trigger voltage value. It can be understood that, when the power supply system transmits electric energy to the power grid, some failures may occur in the power grid (for example, an inductive short circuit to ground occurs in a part of the power grid (for example, some transmission cables or other elements)), causing a voltage drop at the output end of the converter circuit. When the voltage value at the output end of the converter circuit decreases to be less than a specific threshold (for example, the voltage value at the output end of the converter circuit decreases from the first operating voltage value to the second operating voltage value, and the second operating voltage value is less than the first trigger voltage value), the system may determine that the power grid fails, and then perform corresponding adjustment (for example, perform low voltage ride-through), to maintain operation of the power grid. This failure determining method is simple and efficient, and has a timely response and high operation efficiency, so that safety of the system is improved.

With reference to any one of the first aspect to the third possible implementation of the first aspect, in a fourth possible implementation, the drive control circuit may be further configured to: in a process in which the converter circuit increases the value of the current to be output to the power grid from the first operating current value to the low voltage ride-through current value, when it is detected that the voltage value at the output end of the converter circuit increases to a third operating voltage value, and the third operating voltage value is greater than or equal to a first recovery voltage value, obtain duration in which the converter circuit outputs the low voltage ride-through current to the power grid, and use the duration as duration of low voltage ride-through of this time. Herein, a current value of the low voltage ride-through current includes the first low voltage ride-through current value or the second low voltage ride-through current value, and the first recovery voltage value is greater than or equal to the first trigger voltage value. It can be understood that, during low voltage ride-through, if a failure in the power grid is cleared (for example, a failure point is rectified, or the power grid is disconnected in a failure area), the voltage value at the output end of the converter circuit further increases. When the voltage value at the output end of the converter circuit increases to be greater than a specific threshold (for example, the first recovery voltage value), the drive control circuit may obtain the duration in which the converter circuit outputs the low voltage ride-through current to the power grid (in other words, duration in which the system performs low voltage ride-through), and use the duration as the duration of the low voltage ride-through of this time. Herein, the duration of the low voltage ride-through of this time may be recorded and obtained by the drive control circuit, or may be recorded by another element with a timing function in the power supply system and transmitted to the drive control circuit. In this application, a method for obtaining the duration of the low voltage ride-through by the power supply system is simple, flexible, and accurate, so that a response speed and applicability of the system are improved.

With reference to any one of the first aspect to the fourth possible implementation of the first aspect, in a fifth possible implementation, the drive control circuit may be further configured to: in a process in which the converter circuit increases the value of the current to be output to the power grid from the first operating current value to the low voltage ride-through current value, when it is detected that the voltage value at the output end of the converter circuit increases to the third operating voltage value, and the third operating voltage value is greater than or equal to the first recovery voltage value, control the converter circuit to adjust the value of the current to be output to the power grid to a second operating current value. Herein, the current value of the low voltage ride-through current includes the first low voltage ride-through current value or the second low voltage ride-through current value, the first recovery voltage value is greater than or equal to the first trigger voltage value, and the second operating current value is less than a smallest current value of the low voltage ride-through current among current values of the low voltage ride-through current. It can be understood that, during low voltage ride-through, if a failure in the power grid is cleared (for example, a failure point is rectified, or the power grid is disconnected in a failure area), the voltage value at the output end of the converter circuit further increases. When the voltage value at the output end of the converter circuit increases to be greater than a specific threshold (for example, the first recovery voltage value), the converter circuit may decrease an output reactive current, to restore the voltage value at the output end of the converter circuit to a voltage value (for example, the first operating voltage value) at the output end of the converter circuit before the failure occurs, or adjust the voltage value at the output end of the converter circuit to a voltage value suitable for operation of the power grid. That is, in the process in which the converter circuit increases the value of the current to be output to the power grid from the first operating current value to the low voltage ride-through current value, when it is detected that the voltage value at the output end of the converter circuit increases to the third operating voltage value, and the third operating voltage value is greater than or equal to the first recovery voltage value, the drive control circuit may control the converter circuit to output the second operating current value to the power grid. Herein, the second operating current value may be equal to the first operating current value. In this way, the drive control circuit can control, in a timely manner, the converter circuit to adjust a current at the output end of the converter circuit, to prevent the converter circuit from generating heat due to long-time output of a ride-through current. A control method is simple, timely, and flexible, so that a response speed, applicability, and safety of the system are improved.

With reference to any one of the first aspect to the fifth possible implementation of the first aspect, in a sixth possible implementation, the drive control circuit may be further configured to obtain the first low voltage ride-through current value based on the first operating current value, the first operating voltage value, and the second operating voltage value. Herein, the first low voltage ride-through current value meets the following:

$$Iq1 = Is1 + KIn\frac{Us1 - Us2}{Un}$$

Iq1 is the first low voltage ride-through current value, Is1 is the first operating current value, Us1 is the first operating voltage value, Us2 is the second operating voltage value, K is a ride-through current adjustment coefficient, In is a rated current value at the output end of the converter circuit, and Un is a rated voltage value at the output end of the converter circuit. Herein, the system may determine the first low voltage ride-through current value based on the first operating current value, a difference between the first operating voltage value and the second operating voltage value, and a ratio of the rated voltage at the output end of the converter circuit, in combination with the ride-through current adjustment coefficient and the rated current value at the output end of the converter circuit. A calculation method is simple and flexible, so that a response speed, accuracy, and applicability of the system are improved.

With reference to any one of the first aspect to the fifth possible implementation of the first aspect, in a seventh possible implementation, the drive control circuit may be further configured to obtain the first low voltage ride-through current value based on the first operating current value, the first trigger voltage value, and the second operating voltage value. Herein, the first low voltage ride-through current value meets the following:

$$Iq1 = Is1 + KIn\frac{Ul - Us2}{Un}$$

Iq1 is the first low voltage ride-through current value, Is1 is the first operating current value, Ul is the first trigger voltage value, Us2 is the second operating voltage value, K is a ride-through current adjustment coefficient, In is a rated current value at the output end of the converter circuit, and Un is a rated voltage value at the output end of the converter circuit. Herein, the system may determine the first low voltage ride-through current value based on the first operating current value, a difference between the first trigger voltage value and the second operating voltage value, and a ratio of the rated voltage at the output end of the converter circuit, in combination with the ride-through current adjustment coefficient and the rated current value at the output end of the converter circuit. A calculation method is simple, diverse, and flexible, so that a response speed, accuracy, and applicability of the system are improved.

With reference to any one of the first aspect to the seventh possible implementation of the first aspect, in an eighth possible implementation, the drive control circuit may be further configured to: when the power grid fails, control, based on duration of previous high voltage ride-through, the converter circuit to decrease the value of the current to be output to the power grid from the third operating current value to a high voltage ride-through current value, so as to decrease the voltage value at the output end of the converter circuit. Herein, the previous high voltage ride-through is latest high voltage ride-through. It can be understood that, when the power supply system transmits electric energy to the power grid, some failures may occur in the power grid (for example, a capacitive short circuit to ground occurs in a part of the power grid (for example, some transmission cables or other elements)), causing a voltage rise at the output end of the converter circuit. When the voltage value at the output end of the converter circuit increases to be greater than a specific threshold, the converter circuit may decrease an output reactive current (for example, decrease the value of the current to be output to the power grid from the third operating current value to the high voltage ride-through current value), to decrease the voltage value at the output end of the converter circuit to a voltage value capable of maintaining operation of the power grid. This process may be referred to as a high voltage ride-through process. In this case, the drive control circuit may control, based on the duration of the previous high voltage ride-through (to be specific, duration of previous high voltage ride-through performed by the power supply system before a current moment), the converter circuit to decrease the value of the current to be output to the power grid from the third operating current value to the high voltage ride-through current value, so as to decrease the voltage value at the output end of the converter circuit. Herein, the previous high voltage ride-through is latest high voltage ride-through. The power supply system may control, based on the duration of the previous high voltage ride-through, the current to be output by the converter circuit to the power grid, to reduce circuit oscillation, with a simple structure, a simple control method, and high safety.

With reference to the eighth possible implementation of the first aspect, in a ninth possible implementation, the drive control circuit may be further configured to: when the power grid fails and the duration of the previous high voltage ride-through is greater than or equal to a high voltage ride-through time threshold, control the converter circuit to decrease the value of the current to be output to the power grid from the third operating current value to a first high voltage ride-through current value, so as to decrease the voltage value at the output end of the converter circuit. It can be understood that, if the power grid fails at a current moment, and duration of previous high voltage ride-through performed by the power supply system before the current moment is greater than or equal to a specific threshold (for example, the high voltage ride-through time threshold), the drive control circuit may control the value of the current to be output by the converter circuit to be the first high voltage ride-through current value, so that the system can perform stable high voltage ride-through. Herein, the first high voltage ride-through current value may be a current value obtained in advance or in real time by the system, or may be a current value calculated by the system according to a current parameter (for example, an operating voltage of an output end of the converter circuit, an operating current at the output end of the converter circuit, a rated voltage of the output end of the converter circuit, or a rated current at the output end of the converter circuit), or may be a current value defined by a user or a manufacturer in advance or in real time, may also be a current value determined based on a current value of an output end of the converter circuit during the previous high voltage ride-through. It can be understood that a magnitude of a reactive current output by the converter circuit under the control of the drive control circuit may match impedance of the power grid during the previous high voltage ride-through. This prevents a voltage at the output end of the converter circuit from decreasing to an excessively low level, and the system does not stop performing high voltage ride-through due to misjudgment and therefore the voltage at the output end of the voltage converter circuit does not increase again (for example, increase to a voltage that indicates a failure of the power grid). If the duration of the previous high voltage ride-through is greater than or equal to a specific threshold (for example, the high voltage ride-through time threshold), it can be considered that the previous high voltage ride-through is stable. In other words, during high voltage ride-through of this time, the drive control circuit may control the value of the current to be output by the converter circuit to be the first high voltage ride-through current value, so that the power supply system performs high voltage ride-through. It can be understood that, in this case, a magnitude of a reactive current output by the converter circuit matches impedance of the power grid, so that a voltage at the output end of the converter circuit does not decrease to an excessively low level. In addition, the system is prevented from stopping performing high voltage ride-through due to misjudgment, and therefore the voltage at the output end of the voltage converter circuit does not increase again. That is, during the high voltage ride-through of this time, the drive control circuit may control the value of the current to be output by the converter circuit to be the first high voltage ride-through current value, so that the power supply system can perform stable high voltage ride-through, to reduce circuit oscillation, with a simple structure, a simple control method, a timely response, high safety, and high operation efficiency.

With reference to the ninth possible implementation of the first aspect, in a tenth possible implementation, the drive control circuit may be further configured to: when the power grid fails and the duration of the previous high voltage ride-through is less than the high voltage ride-through time threshold, control the converter circuit to decrease the value of the current to be output to the power grid from the third operating current value to a second high voltage ride-through current value, so as to decrease the voltage value at the output end of the converter circuit. Herein, the second high voltage ride-through current value is greater than the first high voltage ride-through current value. It can be understood that, if the power grid fails at a current moment, and duration of previous high voltage ride-through performed by the power supply system before the current moment is less than a specific threshold (for example, the high voltage ride-through time threshold), the drive control circuit may control the value of the current to be output by the converter circuit to be the second high voltage ride-through current value, so that the system can perform stable high voltage ride-through. Herein, the second high voltage ride-through current value is greater than the first high voltage ride-through current value. Herein, the second high voltage ride-through current value may be a current value that is obtained by the system in advance or in real time and that is greater than the first high voltage ride-through current value, or may be a current value that is calculated or obtained by the system based on a current parameter (for example, an operating voltage at the output end of the converter circuit, an operating current at the output end of the converter circuit, a rated voltage at the output end of the converter circuit, or a rated current at the output end of the converter circuit) and that is greater than the first high voltage ride-through current value, or may be a current value that is defined by a user or a manufacturer in advance or in real time and that is greater than the first high voltage ride-through current value, or may be a current value that is determined based on a current value at the output end of the converter circuit during the previous high voltage ride-through and that is greater than the first high voltage ride-through current value. It can be understood that a magnitude of a reactive current output by the converter circuit under the control of the drive control circuit may not match impedance of the power grid during the previous high voltage ride-through. As a result, a voltage at the output end of the converter circuit may decrease to an excessively low level. Further, the system stops performing high voltage ride-through due to misjudgment, and therefore the voltage at the output end of the voltage converter circuit increases again (for example, increases to a voltage that indicates a failure of the power grid). Consequently, the duration of the previous high voltage ride-through is less than a specific threshold (for example, the high voltage ride-through time threshold). In other words, during the high voltage ride-through of this time, the drive control circuit may control the value of the current to be output by the converter circuit to be the second high voltage ride-through current value, so that the power supply system performs stable high voltage ride-through. Further, it can be understood that, in this case, a magnitude (for example, the second high voltage ride-through current value) of a reactive current output by the converter circuit matches impedance of the power grid, so that a voltage at the output end of the converter circuit does not decrease to an excessively low level. In addition, the system is prevented from stopping performing high voltage ride-through due to misjudgment, and therefore the voltage at the output end of the voltage converter circuit does not increase again. That is, during the high voltage ride-through of this time, the drive control circuit may control the value of the current to be output by the converter circuit to be the second high voltage ride-through current value, so that the power supply system can perform stable high voltage ride-through, to reduce circuit oscillation, with a simple structure, a simple control method, a timely response, high safety, and high operation efficiency.

With reference to any one of the eighth possible implementation of the first aspect to the tenth possible implementation of the first aspect, in an eleventh possible implementation, the converter circuit may be configured to determine that the power grid fails when it is detected that the voltage value at the output end of the converter circuit increases from a fourth operating voltage value to a fifth operating voltage value, and the fifth operating voltage value is greater than a second trigger voltage value. It can be understood that, when the power supply system transmits electric energy to the power grid, some failures may occur in the power grid (for example, a capacitive short circuit to ground occurs in a part of the power grid (for example, some transmission cables or other elements)), causing a voltage rise at the output end of the converter circuit. When the voltage value at the output end of the converter circuit increases to be greater than a specific threshold (for example, the voltage value at the output end of the converter circuit increases from the fourth operating voltage value to the fifth operating voltage value, and the fifth operating voltage value is greater than the second trigger voltage value), the system may determine that the power grid fails, and then perform corresponding adjustment (for example, perform high voltage ride-through), to maintain operation of the power grid. This failure determining method is simple and efficient, and has a timely response and high operation efficiency, so that safety of the system is improved.

With reference to any one of the eighth possible implementation of the first aspect to the eleventh possible implementation of the first aspect, in a twelfth possible implementation, the drive control circuit may be further configured to: in a process in which the converter circuit decreases the value of the current to be output to the power grid from the third operating current value to the high voltage ride-through current value, when it is detected that the voltage value at the output end of the converter circuit decreases to a sixth operating voltage value, and the sixth operating voltage value is less than or equal to a second recovery voltage value, obtain duration in which the converter circuit outputs the high voltage ride-through current to the power grid, and use the duration as duration of high voltage ride-through of this time. Herein, a current value of the high voltage ride-through current includes the first high voltage ride-through current value or the second high voltage ride-through current value, and the second recovery voltage value is less than or equal to the second trigger voltage value. It can be understood that, during high voltage ride-through, if a failure in the power grid is cleared (for example, a failure point is rectified, or the power grid is disconnected in a failure area), the voltage value at the output end of the converter circuit further decreases. When the voltage value at the output end of the converter circuit decreases to be less than a specific threshold (for example, the second recovery voltage value), the drive control circuit may obtain the duration in which the converter circuit outputs the high voltage ride-through current to the power grid (in other words, duration in which the system performs high voltage ride-through), and use the duration as the duration of the high voltage ride-through of this time. Herein, the duration of the high voltage ride-through of this time may be recorded and obtained by the drive control circuit, or may be recorded by another element with a timing function in the power supply system and transmitted to the drive control circuit. In this application, a method for obtaining the duration of the high voltage ride-through by the power supply system is simple, flexible, and accurate, so that a response speed and applicability of the system are improved.

With reference to any one of the eighth possible implementation of the first aspect to the twelfth possible implementation of the first aspect, in a thirteenth possible implementation, the drive control circuit may be further configured to: in a process in which the converter circuit decreases the value of the current to be output to the power grid from the third operating current value to the high voltage ride-through current value, when it is detected that the voltage value at the output end of the converter circuit decreases to the sixth operating voltage value, and the sixth operating voltage value is less than or equal to the second recovery voltage value, control the converter circuit to adjust the value of the current to be output to the power grid to the fourth operating current value. Herein, the current value of the high voltage ride-through current includes the first high voltage ride-through current value or the second high voltage ride-through current value, the second recovery voltage value is less than or equal to the second trigger voltage value, and the fourth operating current value is greater than a largest current value of the high voltage ride-through current among current values of the high voltage ride-through current. It can be understood that, during high voltage ride-through, if a failure in the power grid is cleared (for example, a failure point is rectified, or the power grid is disconnected in a failure area), the voltage value at the output end of the converter circuit further decreases. When the voltage value at the output end of the converter circuit decreases to be less than a specific threshold (for example, the second recovery voltage value), the converter circuit may increase an output reactive current, to restore the voltage value at the output end of the converter circuit to a voltage value (for example, the fourth operating voltage value) at the output end of the converter circuit before the failure occurs, or adjust the voltage value at the output end of the converter circuit to a voltage value suitable for operation of the power grid. That is, in the process in which the converter circuit decreases the value of the current to be output to the power grid from the third operating current value to the high voltage ride-through current value, when it is detected that the voltage value at the output end of the converter circuit decreases to the sixth operating voltage value, and the sixth operating voltage value is less than or equal to the second recovery voltage value, the drive control circuit may control the converter circuit to output the fourth operating current value to the power grid. Herein, the fourth operating current value may be equal to the third operating current value. In this way, the drive control circuit can control, in a timely manner, the converter circuit to adjust a current at the output end of the converter circuit, to prevent the converter circuit from generating heat due to long-time output of a ride-through current. A control method is simple, timely, and flexible, so that a response speed, applicability, and safety of the system are improved.

With reference to any one of the eighth possible implementation of the first aspect to the thirteenth possible implementation of the first aspect, in a fourteenth possible implementation, the drive control circuit may be further configured to obtain the first high voltage ride-through current value based on the third operating current value, the fourth operating voltage value, and the fifth operating voltage value. Herein, the first high voltage ride-through current value meets the following:

$$Iq3 = Is3 + KIn\frac{Us4 - Us5}{Un}$$

Iq3 is the first high voltage ride-through current value, Is3 is the third operating current value, Us4 is the fourth operating voltage value, Us5 is the fifth operating voltage value, K is the ride-through current adjustment coefficient, In is the rated current value at the output end of the converter circuit, and Un is the rated voltage value at the output end of the converter circuit. Herein, the system may determine the first high voltage ride-through current value based on the third operating current value, a difference between the fourth operating voltage value and the fifth operating voltage value, and a ratio of the rated voltage at the output end of the converter circuit, in combination with the ride-through current adjustment coefficient and the rated current value at the output end of the converter circuit. A calculation method is simple and flexible, so that a response speed, accuracy, and applicability of the system are improved.

With reference to any one of the eighth possible implementation of the first aspect to the thirteenth possible implementation of the first aspect, in a fifteenth possible implementation, the drive control circuit may be further configured to obtain the first high voltage ride-through current value based on the third operating current value, the second trigger voltage value, and the fifth operating voltage value. Herein, the first high voltage ride-through current value meets the following:

$$Iq3 = Is3 + KIn\frac{Uh - Us5}{Un}$$

Iq3 is the first high voltage ride-through current value, Is3 is the third operating current value, Uh is the second trigger voltage value, Us5 is the fifth operating voltage value, K is the ride-through current adjustment coefficient, In is the rated current value at the output end of the converter circuit, and Un is the rated voltage value at the output end of the converter circuit. Herein, the system may determine the first high voltage ride-through current value based on the third operating current value, a difference between the second trigger voltage value and the fifth operating voltage value, and a ratio of the rated voltage at the output end of the converter circuit, in combination with the ride-through current adjustment coefficient and the rated current value at the output end of the converter circuit. A calculation method is simple, diverse, and flexible, so that a response speed, accuracy, and applicability of the system are improved.

With reference to any one of the first aspect to the fifteenth possible implementation of the first aspect, in a sixteenth possible implementation, the power generation apparatus is a photovoltaic power generation apparatus, a wind power generation apparatus, a thermal power generation apparatus, a nuclear power generation apparatus, a chemical power generation apparatus, or a biomass power generation apparatus.

With reference to the sixteenth possible implementation of the first aspect, in a seventeenth possible implementation, the power generation apparatus is a photovoltaic power generation apparatus, the power supply system further includes a combiner box, and the power generation apparatus is connected to the converter circuit through the combiner box.

With reference to the seventeenth possible implementation of the first aspect, in an eighteenth possible implementation, the power supply system further includes a direct current bus, the power generation apparatus is connected to the direct current bus through the combiner box, and the direct current bus is connected to the converter circuit.

With reference to the eighteenth possible implementation of the first aspect, in a nineteenth possible implementation, the power supply system further includes a transformer, and the converter circuit is connected to the power grid through the transformer.

With reference to the nineteenth possible implementation of the first aspect, in a twentieth possible implementation, the power supply system further includes an on-grid/off-grid wiring apparatus, and the transformer is connected to the power grid through the on-grid/off-grid wiring apparatus.

In this application, the power generation apparatus in the power supply system has various representation forms, the power generation apparatus and the converter circuit are connected in flexible manners, and functional modules in the power supply system are combined in various and flexible manners, so that diversity of application scenarios of the power supply system can be improved, and adaptability of the power supply system can be improved.

According to a second aspect, this application provides a conversion method for a power supply system. The method is applicable to the power supply system provided in any one of the first aspect or the possible implementations of the first aspect. In the method, an operating status of a power grid connected to the power supply system may be detected. When it is detected that the operating status of the power grid is failed, a drive control circuit controls, based on duration of previous low voltage ride-through, a converter circuit to increase a value of a current to be output to the power grid from a first operating current value to a low voltage ride-through current value, so as to increase a voltage value at an output end of the converter circuit. Herein, the previous low voltage ride-through is latest low voltage ride-through. It can be understood that, when the power supply system transmits electric energy to the power grid, some failures may occur in the power grid (for example, an inductive short circuit to ground occurs in a part of the power grid (for example, some transmission cables or other elements)), causing a voltage drop at the output end of the converter circuit. When the voltage value at the output end of the converter circuit decreases to be less than a specific threshold, the converter circuit may increase an output reactive current (for example, increase the value of the current to be output to the power grid from the first operating current value to the low voltage ride-through current value), to increase the voltage value at the output end of the converter circuit to a voltage value capable of maintaining operation of the power grid. This process may be referred to as a low voltage ride-through process. In this case, the drive control circuit may control, based on the duration of the previous low voltage ride-through (to be specific, duration of previous low voltage ride-through performed by the power supply system before a current moment), the converter circuit to increase the value of the current to be output to the power grid from the first operating current value to the low voltage ride-through current value, so as to increase the voltage value at the output end of the converter circuit. Herein, the previous low voltage ride-through is latest low voltage ride-through. The power supply system may control, based on the duration of the previous low voltage ride-through, the current to be output by the converter circuit to the power grid, to reduce circuit oscillation, with a simple structure, a simple control method, and high safety.

With reference to the second aspect, in a first possible implementation, that a drive control circuit controls, based on duration of previous low voltage ride-through, a converter circuit to increase a value of a current to be output to the power grid from a first operating current value to a low voltage ride-through current value includes: When it is detected that the power grid fails and the duration of the previous low voltage ride-through is greater than or equal to a low voltage ride-through time threshold, the drive control circuit controls the converter circuit to increase the value of the current to be output to the power grid from the first operating current value to a first low voltage ride-through current value. It can be understood that, if the power grid fails at a current moment, and duration of previous low voltage ride-through performed by the power supply system before the current moment is greater than or equal to a specific threshold (for example, the low voltage ride-through time threshold), the drive control circuit may control the value of the current to be output by the converter circuit to be the first low voltage ride-through current value, so that the system can perform stable low voltage ride-through. Herein, the first low voltage ride-through current value may be a current value obtained by the system in advance or in real time, or may be a current value calculated by the system based on a current system parameter (for example, an operating voltage at the output end of the converter circuit, an operating current at the output end of the converter circuit, a rated voltage at the output end of the converter circuit, or a rated current at the output end of the converter circuit), or may be a current value defined by a user or a manufacturer in advance or in real time, or may be a current value determined based on a current value at the output end of the converter circuit during the previous low voltage ride-through. It can be understood that a magnitude of a reactive current output by the converter circuit under the control of the drive control circuit may match impedance of the power grid during the previous low voltage ride-through. This prevents a voltage at the output end of the converter circuit from increasing to an excessively high level, and the system does not stop performing low voltage ride-through due to misjudgment and therefore the voltage at the output end of the voltage converter circuit does not decrease again (for example, decrease to a voltage that indicates a failure of the power grid). If the duration of the previous low voltage ride-through is greater than or equal to a specific threshold (for example, the low voltage ride-through time threshold), it can be considered that the previous low voltage ride-through is stable. In other words, during low voltage ride-through of this time, the drive control circuit may control the value of the current to be output by the converter circuit to be the first low voltage ride-through current value, so that the power supply system performs low voltage ride-through. It can be understood that, in this case, a magnitude of a reactive current output by the converter circuit matches impedance of the power grid, so that a voltage at the output end of the converter circuit does not increase to an excessively high level. In addition, the system is prevented from stopping performing low voltage ride-through due to misjudgment, and therefore the voltage at the output end of the voltage converter circuit does not decrease again. That is, during the low voltage ride-through of this time, the drive control circuit may control the value of the current to be output by the converter circuit to be the first low voltage ride-through current value, so that the power supply system can perform stable low voltage ride-through, to reduce circuit oscillation, with a simple structure, a simple control method, a timely response, high safety, and high operation efficiency.

With reference to the first possible implementation of the second aspect, in a second possible implementation, that a drive control circuit controls, based on duration of previous low voltage ride-through, a converter circuit to increase a value of a current to be output to the power grid from a first operating current value to a low voltage ride-through current value further includes: When it is detected that the power grid fails and the duration of the previous low voltage ride-through is less than the low voltage ride-through time threshold, the drive control circuit controls the converter circuit to increase the current value of the current to be output to the power grid from the first operating current value to a second low voltage ride-through current value, so as to increase the voltage value at the output end of the converter circuit. Herein, the second low voltage ride-through current value is less than the first low voltage ride-through current value. It can be understood that, if the power grid fails at a current moment, and duration of previous low voltage ride-through performed by the power supply system before the current moment is less than a specific threshold (for example, the low voltage ride-through time threshold), the drive control circuit may control the value of the current to be output by the converter circuit to be the second low voltage ride-through current value, so that the system can perform stable low voltage ride-through. Herein, the second low voltage ride-through current value is less than the first low voltage ride-through current value. Herein, the second low voltage ride-through current value may be a current value that is obtained by the system in advance or in real time and that is less than the first low voltage ride-through current value, or may be a current value that is calculated or obtained by the system based on a current parameter (for example, an operating voltage at the output end of the converter circuit, an operating current at the output end of the converter circuit, a rated voltage at the output end of the converter circuit, or a rated current at the output end of the converter circuit) and that is less than the first low voltage ride-through current value, or may be a current value that is defined by a user or a manufacturer in advance or in real time and that is less than the first low voltage ride-through current value, or may be a current value that is determined based on a current value at the output end of the converter circuit during the previous low voltage ride-through and that is less than the first low voltage ride-through current value. It can be understood that a magnitude of a reactive current output by the converter circuit under the control of the drive control circuit may not match impedance of the power grid during the previous low voltage ride-through. As a result, a voltage at the output end of the converter circuit may increase to an excessively high level. Further, the system stops performing low voltage ride-through due to misjudgment, and therefore the voltage at the output end of the voltage converter circuit decreases again (for example, decreases to a voltage that indicates a failure of the power grid). Consequently, the duration of the previous low voltage ride-through is less than a specific threshold (for example, the low voltage ride-through time threshold). In other words, during the low voltage ride-through of this time, the drive control circuit may control the value of the current to be output by the converter circuit to be the second low voltage ride-through current value, so that the power supply system performs stable low voltage ride-through. Further, it can be understood that, in this case, a magnitude (for example, the second low voltage ride-through current value) of a reactive current output by the converter circuit matches impedance of the power grid, so that a voltage at the output end of the converter circuit does not increase to an excessively high level. In addition, the system is prevented from stopping performing low voltage ride-through due to misjudgment, and therefore the voltage at the output end of the voltage converter circuit does not decrease again. That is, during the low voltage ride-through of this time, the drive control circuit may control the value of the current to be output by the converter circuit to be the second low voltage ride-through current value, so that the power supply system can perform stable low voltage ride-through, to reduce circuit oscillation, with a simple structure, a simple control method, a timely response, high safety, and high operation efficiency.

With reference to any one of the second aspect to the second possible implementation of the second aspect, in a third possible implementation, the detecting an operating status of a power grid connected to the power supply system includes: obtaining the voltage value at the output end of the converter circuit; and when it is detected that the voltage value at the output end of the converter circuit decreases from a first operating voltage value to a second operating voltage value, and the second operating voltage value is less than a first trigger voltage value, determining, by the converter circuit, that it is detected that the operating status of the power grid is failed. It can be understood that, when the power supply system transmits electric energy to the power grid, some failures may occur in the power grid (for example, an inductive short circuit to ground occurs in a part of the power grid (for example, some transmission cables or other elements)), causing a voltage drop at the output end of the converter circuit. When the voltage value at the output end of the converter circuit decreases to be less than a specific threshold (for example, the voltage value at the output end of the converter circuit decreases from the first operating voltage value to the second operating voltage value, and the second operating voltage value is less than the first trigger voltage value), the system may determine that the power grid fails, and then perform corresponding adjustment (for example, perform low voltage ride-through), to maintain operation of the power grid. This failure determining method is simple and efficient, and has a timely response and high operation efficiency, so that safety of the system is improved.

With reference to any one of the second aspect to the third possible implementation of the second aspect, in a fourth possible implementation, the method further includes: In a process in which the converter circuit increases the value of the current to be output to the power grid from the first operating current value to the low voltage ride-through current value, when it is detected that the voltage value at the output end of the converter circuit increases to a third operating voltage value, and the third operating voltage value is greater than or equal to a first recovery voltage value, the drive control circuit obtains duration in which the converter circuit outputs the ride-through current to the power grid, and uses the duration as duration of low voltage ride-through of this time. Herein, a current value of the low voltage ride-through current includes the first low voltage ride-through current value or the second low voltage ride-through current value, and the first recovery voltage value is greater than or equal to the first trigger voltage value. It can be understood that, during low voltage ride-through, if a failure in the power grid is cleared (for example, a failure point is rectified, or the power grid is disconnected in a failure area), the voltage value at the output end of the converter circuit further increases. When the voltage value at the output end of the converter circuit increases to be greater than a specific threshold (for example, the first recovery voltage value), the drive control circuit may obtain the duration in which the converter circuit outputs the low voltage ride-through current to the power grid (in other words, duration in which the system performs low voltage ride-through), and use the duration as the duration of the low voltage ride-through of this time. Herein, the duration of the low voltage ride-through of this time may be recorded and obtained by the drive control circuit, or may be recorded by another element with a timing function in the power supply system and transmitted to the drive control circuit. In this application, a method for obtaining the duration of the low voltage ride-through by the power supply system is simple, flexible, and accurate, so that a response speed and applicability of the system are improved.

With reference to any one of the second aspect to the fourth possible implementation of the second aspect, in a fifth possible implementation, the method further includes: In a process in which the converter circuit increases the value of the current to be output to the power grid from the first operating current value to the low voltage ride-through current value, when it is detected that the voltage value at the output end of the converter circuit increases to the third operating voltage value, and the third operating voltage value is greater than or equal to the first recovery voltage value, the drive control circuit controls the converter circuit to adjust the value of the current to be output to the power grid to a second operating current value. Herein, the current value of the low voltage ride-through current includes the first low voltage ride-through current value or the second low voltage ride-through current value, the first recovery voltage value is greater than or equal to the first trigger voltage value, and the second operating current value is less than a smallest current value of the low voltage ride-through current among current values of the low voltage ride-through current. It can be understood that, during low voltage ride-through, if a failure in the power grid is cleared (for example, a failure point is rectified, or the power grid is disconnected in a failure area), the voltage value at the output end of the converter circuit further increases. When the voltage value at the output end of the converter circuit increases to be greater than a specific threshold (for example, the first recovery voltage value), the converter circuit may decrease an output reactive current, to restore the voltage value at the output end of the converter circuit to a voltage value (for example, the first operating voltage value) at the output end of the converter circuit before the failure occurs, or adjust the voltage value at the output end of the converter circuit to a voltage value suitable for operation of the power grid. That is, in the process in which the converter circuit increases the value of the current to be output to the power grid from the first operating current value to the low voltage ride-through current value, when it is detected that the voltage value at the output end of the converter circuit increases to the third operating voltage value, and the third operating voltage value is greater than or equal to the first recovery voltage value, the drive control circuit may control the converter circuit to output the second operating current value to the power grid. Herein, the second operating current value may be equal to the first operating current value. In this way, the drive control circuit can control, in a timely manner, the converter circuit to adjust a current at the output end of the converter circuit, to prevent the converter circuit from generating heat due to long-time output of a ride-through current. A control method is simple, timely, and flexible, so that a response speed, applicability, and safety of the system are improved.

With reference to any one of the second aspect to the fifth possible implementation of the second aspect, in a sixth possible implementation, the first low voltage ride-through current value meets the following:

$$Iq1 = Is1 + KIn\frac{Us1 - Us2}{Un}$$

Iq1 is the first low voltage ride-through current value, Is1 is the first operating current value, Us1 is the first operating voltage value, Us2 is the second operating voltage value, K is a ride-through current adjustment coefficient, In is a rated current value at the output end of the converter circuit, and Un is a rated voltage value at the output end of the converter circuit. Herein, the system may determine the first low voltage ride-through current value based on the first operating current value, a difference between the first operating voltage value and the second operating voltage value, and a ratio of the rated voltage at the output end of the converter circuit, in combination with the ride-through current adjustment coefficient and the rated current value at the output end of the converter circuit. A calculation method is simple and flexible, so that a response speed, accuracy, and applicability of the system are improved.

With reference to any one of the second aspect to the fifth possible implementation of the second aspect, in a seventh possible implementation, the first low voltage ride-through current value meets the following:

$$Iq1 = Is1 + KIn\frac{Ul - Us2}{Un}$$

Iq1 is the first low voltage ride-through current value, Is1 is the first operating current value, Ul is the first trigger voltage value, Us2 is the second operating voltage value, K is a ride-through current adjustment coefficient, In is a rated current value at the output end of the converter circuit, and Un is a rated voltage value at the output end of the converter circuit. Herein, the system may determine the first low voltage ride-through current value based on the first operating current value, a difference between the first trigger voltage value and the second operating voltage value, and a ratio of the rated voltage at the output end of the converter circuit, in combination with the ride-through current adjustment coefficient and the rated current value at the output end of the converter circuit. A calculation method is simple, diverse, and flexible, so that a response speed, accuracy, and applicability of the system are improved.

With reference to any one of the second aspect to the seventh possible implementation of the second aspect, in an eighth possible implementation, the method further includes: The operating status of the power grid connected to the power supply system may be detected. When it is detected that the operating status of the power grid is failed, the drive control circuit controls, based on duration of previous high voltage ride-through, the converter circuit to decrease the value of the current to be output to the power grid from a third operating current value to a high voltage ride-through current value, so as to decrease a voltage value at an output end of the converter circuit. Herein, the previous high voltage ride-through is latest low voltage ride-through. It can be understood that, when the power supply system transmits electric energy to the power grid, some failures may occur in the power grid (for example, a capacitive short circuit to ground occurs in a part of the power grid (for example, some transmission cables or other elements)), causing a voltage rise at the output end of the converter circuit. When the voltage value at the output end of the converter circuit increases to be greater than a specific threshold, the converter circuit may decrease an output reactive current (for example, decrease the value of the current to be output to the power grid from the third operating current value to the high voltage ride-through current value), to decrease the voltage value at the output end of the converter circuit to a voltage value capable of maintaining operation of the power grid. This process may be referred to as a high voltage ride-through process. In this case, the drive control circuit may control, based on the duration of the previous high voltage ride-through (to be specific, duration of previous high voltage ride-through performed by the power supply system before a current moment), the converter circuit to decrease the value of the current to be output to the power grid from the third operating current value to the high voltage ride-through current value, so as to decrease the voltage value at the output end of the converter circuit. Herein, the previous high voltage ride-through is latest high voltage ride-through. The power supply system may control, based on the duration of the previous high voltage ride-through, the current to be output by the converter circuit to the power grid, to reduce circuit oscillation, with a simple structure, a simple control method, and high safety.

With reference to the eighth possible implementation of the second aspect, in a ninth possible implementation, that the drive control circuit controls, based on duration of previous high voltage ride-through, the converter circuit to decrease the value of the current to be output to the power grid from a third operating current value to a high voltage ride-through current value includes: When it is detected that the power grid fails and the duration of the previous high voltage ride-through is greater than or equal to a high voltage ride-through time threshold, the drive control circuit controls the converter circuit to decrease the value of the current to be output to the power grid from the third operating current value to a first high voltage ride-through current value, so as to decrease the voltage value at the output end of the converter circuit. It can be understood that, if the power grid fails at a current moment, and duration of previous high voltage ride-through performed by the power supply system before the current moment is greater than or equal to a specific threshold (for example, the high voltage ride-through time threshold), the drive control circuit may control the value of the current to be output by the converter circuit to be the first high voltage ride-through current value, so that the system can perform stable high voltage ride-through. Herein, the first high voltage ride-through current value may be a current value obtained in advance or in real time by the system, or may be a current value calculated by the system according to a current parameter (for example, an operating voltage of an output end of the converter circuit, an operating current at the output end of the converter circuit, a rated voltage of the output end of the converter circuit, or a rated current at the output end of the converter circuit), or may be a current value defined by a user or a manufacturer in advance or in real time, may also be a current value determined based on a current value of an output end of the converter circuit during the previous high voltage ride-through. It can be understood that a magnitude of a reactive current output by the converter circuit under the control of the drive control circuit may match impedance of the power grid during the previous high voltage ride-through. This prevents a voltage at the output end of the converter circuit from decreasing to an excessively low level, and the system does not stop performing high voltage ride-through due to misjudgment and therefore the voltage at the output end of the voltage converter circuit does not increase again (for example, increase to a voltage that indicates a failure of the power grid). If the duration of the previous high voltage ride-through is greater than or equal to a specific threshold (for example, the high voltage ride-through time threshold), it can be considered that the previous high voltage ride-through is stable. In other words, during high voltage ride-through of this time, the drive control circuit may control the value of the current to be output by the converter circuit to be the first high voltage ride-through current value, so that the power supply system performs high voltage ride-through. It can be understood that, in this case, a magnitude of a reactive current output by the converter circuit matches impedance of the power grid, so that a voltage at the output end of the converter circuit does not decrease to an excessively low level. In addition, the system is prevented from stopping performing high voltage ride-through due to misjudgment, and therefore the voltage at the output end of the voltage converter circuit does not increase again. That is, during the high voltage ride-through of this time, the drive control circuit may control the value of the current to be output by the converter circuit to be the first high voltage ride-through current value, so that the power supply system can perform stable high voltage ride-through, to reduce circuit oscillation, with a simple structure, a simple control method, a timely response, high safety, and high operation efficiency.

With reference to the ninth possible implementation of the second aspect, in a tenth possible implementation, that the drive control circuit controls, based on duration of previous high voltage ride-through, the converter circuit to decrease the value of the current to be output to the power grid from a third operating current value to a high voltage ride-through current value further includes: When it is detected that the power grid fails and the duration of the previous high voltage ride-through is less than the high voltage ride-through time threshold, the drive control circuit controls the converter circuit to decrease the value of the current to be output to the power grid from the third operating current value to a second high voltage ride-through current value, so as to decrease the voltage value at the output end of the converter circuit. Herein, the second high voltage ride-through current value is greater than the first high voltage ride-through current value. It can be understood that, if the power grid fails at a current moment, and duration of previous high voltage ride-through performed by the power supply system before the current moment is less than a specific threshold (for example, the high voltage ride-through time threshold), the drive control circuit may control the value of the current to be output by the converter circuit to be the second high voltage ride-through current value, so that the system can perform stable high voltage ride-through. Herein, the second high voltage ride-through current value is greater than the first high voltage ride-through current value. Herein, the second high voltage ride-through current value may be a current value that is obtained by the system in advance or in real time and that is greater than the first high voltage ride-through current value, or may be a current value that is calculated or obtained by the system based on a current parameter (for example, an operating voltage at the output end of the converter circuit, an operating current at the output end of the converter circuit, a rated voltage at the output end of the converter circuit, or a rated current at the output end of the converter circuit) and that is greater than the first high voltage ride-through current value, or may be a current value that is defined by a user or a manufacturer in advance or in real time and that is greater than the first high voltage ride-through current value, or may be a current value that is determined based on a current value at the output end of the converter circuit during the previous high voltage ride-through and that is greater than the first high voltage ride-through current value. It can be understood that a magnitude of a reactive current output by the converter circuit under the control of the drive control circuit may not match impedance of the power grid during the previous high voltage ride-through. As a result, a voltage at the output end of the converter circuit may decrease to an excessively low level. Further, the system stops performing high voltage ride-through due to misjudgment, and therefore the voltage at the output end of the voltage converter circuit increases again (for example, increases to a voltage that indicates a failure of the power grid). Consequently, the duration of the previous high voltage ride-through is less than a specific threshold (for example, the high voltage ride-through time threshold). In other words, during the high voltage ride-through of this time, the drive control circuit may control the value of the current to be output by the converter circuit to be the second high voltage ride-through current value, so that the power supply system performs stable high voltage ride-through. Further, it can be understood that, in this case, a magnitude (for example, the second high voltage ride-through current value) of a reactive current output by the converter circuit matches impedance of the power grid, so that a voltage at the output end of the converter circuit does not decrease to an excessively low level. In addition, the system is prevented from stopping performing high voltage ride-through due to misjudgment, and therefore the voltage at the output end of the voltage converter circuit does not increase again. That is, during the high voltage ride-through of this time, the drive control circuit may control the value of the current to be output by the converter circuit to be the second high voltage ride-through current value, so that the power supply system can perform stable high voltage ride-through, to reduce circuit oscillation, with a simple structure, a simple control method, a timely response, high safety, and high operation efficiency.

With reference to any one of the second aspect to the tenth possible implementation of the second aspect, in an eleventh possible implementation, the detecting an operating status of a power grid connected to the power supply system includes: obtaining the voltage value at the output end of the converter circuit; and when it is detected that the voltage value at the output end of the converter circuit increases from a fourth operating voltage value to a fifth operating voltage value, and the fifth operating voltage value is greater than a second trigger voltage value, determining, by the converter circuit, that it is detected that the operating status of the power grid is failed. It can be understood that, when the power supply system transmits electric energy to the power grid, some failures may occur in the power grid (for example, a capacitive short circuit to ground occurs in a part of the power grid (for example, some transmission cables or other elements)), causing a voltage rise at the output end of the converter circuit. When the voltage value at the output end of the converter circuit increases to be greater than a specific threshold (for example, the voltage value at the output end of the converter circuit increases from the fourth operating voltage value to the fifth operating voltage value, and the fifth operating voltage value is greater than the second trigger voltage value), the system may determine that the power grid fails, and then perform corresponding adjustment (for example, perform high voltage ride-through), to maintain operation of the power grid. This failure determining method is simple and efficient, and has a timely response and high operation efficiency, so that safety of the system is improved.

With reference to any one of the second aspect to the eleventh possible implementation of the second aspect, in a twelfth possible implementation, the method further includes: In a process in which the converter circuit decreases the value of the current to be output to the power grid from the third operating current value to the high voltage ride-through current value, when it is detected that the voltage value at the output end of the converter circuit decreases to a sixth operating voltage value, and the sixth operating voltage value is less than or equal to a second recovery voltage value, the drive control circuit obtains duration in which the converter circuit outputs the high voltage ride-through current to the power grid, and uses the duration as duration of high voltage ride-through of this time. Herein, a current value of the ride-through current includes a first high voltage ride-through current value or a second high voltage ride-through current value, and the second recovery voltage value is less than or equal to the second trigger voltage value. It can be understood that, during high voltage ride-through, if a failure in the power grid is cleared (for example, a failure point is rectified, or the power grid is disconnected in a failure area), the voltage value at the output end of the converter circuit further decreases. When the voltage value at the output end of the converter circuit decreases to be less than a specific threshold (for example, the second recovery voltage value), the drive control circuit may obtain the duration in which the converter circuit outputs the high voltage ride-through current to the power grid (in other words, duration in which the system performs high voltage ride-through), and use the duration as the duration of the high voltage ride-through of this time. Herein, the duration of the high voltage ride-through of this time may be recorded and obtained by the drive control circuit, or may be recorded by another element with a timing function in the power supply system and transmitted to the drive control circuit. In this application, a method for obtaining the duration of the high voltage ride-through by the power supply system is simple, flexible, and accurate, so that a response speed and applicability of the system are improved.

With reference to any one of the second aspect to the twelfth possible implementation of the second aspect, in a thirteenth possible implementation, the method further includes: in a process in which the converter circuit decreases the value of the current to be output to the power grid from the third operating current value to the high voltage ride-through current value, when it is detected that the voltage value at the output end of the converter circuit decreases to the sixth operating voltage value, and the sixth operating voltage value is less than or equal to the second recovery voltage value, controlling the converter circuit to adjust the value of the current to be output to the power grid to the fourth operating current value. Herein, the current value of the high voltage ride-through current includes the first high voltage ride-through current value or the second high voltage ride-through current value, the second recovery voltage value is less than or equal to the second trigger voltage value, and the fourth operating current value is greater than a largest current value of the high voltage ride-through current among current values of the high voltage ride-through current. It can be understood that, during high voltage ride-through, if a failure in the power grid is cleared (for example, a failure point is rectified, or the power grid is disconnected in a failure area), the voltage value at the output end of the converter circuit further decreases. When the voltage value at the output end of the converter circuit decreases to be less than a specific threshold (for example, the second recovery voltage value), the converter circuit may increase an output reactive current, to restore the voltage value at the output end of the converter circuit to a voltage value (for example, the fourth operating voltage value) at the output end of the converter circuit before the failure occurs, or adjust the voltage value at the output end of the converter circuit to a voltage value suitable for operation of the power grid. That is, in the process in which the converter circuit decreases the value of the current to be output to the power grid from the third operating current value to the high voltage ride-through current value, when it is detected that the voltage value at the output end of the converter circuit decreases to the sixth operating voltage value, and the sixth operating voltage value is less than or equal to the second recovery voltage value, the drive control circuit may control the converter circuit to output the fourth operating current value to the power grid. Herein, the fourth operating current value may be equal to the third operating current value. In this way, the drive control circuit can control, in a timely manner, the converter circuit to adjust a current at the output end of the converter circuit, to prevent the converter circuit from generating heat due to long-time output of a ride-through current. A control method is simple, timely, and flexible, so that a response speed, applicability, and safety of the system are improved.

With reference to any one of the second aspect to the thirteenth possible implementation of the second aspect, in a fourteenth possible implementation, the first high voltage ride-through current value meets the following:

$$Iq3 = Is3 + KIn\frac{Us4 - Us5}{Un}$$

Iq3 is the first high voltage ride-through current value, Is3 is the third operating current value, Us4 is the fourth operating voltage value, Us5 is the fifth operating voltage value, K is the ride-through current adjustment coefficient, In is the rated current value at the output end of the converter circuit, and Un is the rated voltage value at the output end of the converter circuit. Herein, the system may determine the first high voltage ride-through current value based on the third operating current value, a difference between the fourth operating voltage value and the fifth operating voltage value, and a ratio of the rated voltage at the output end of the converter circuit, in combination with the ride-through current adjustment coefficient and the rated current value at the output end of the converter circuit. A calculation method is simple and flexible, so that a response speed, accuracy, and applicability of the system are improved.

With reference to any one of the second aspect to the thirteenth possible implementation of the second aspect, in a fifteenth possible implementation, the first high voltage ride-through current value meets the following:

$$Iq3 = Is3 + KIn\frac{Uh - Us5}{Un}$$

Iq3 is the first high voltage ride-through current value, Is3 is the third operating current value, Uh is the second trigger voltage value, Us5 is the fifth operating voltage value, K is the ride-through current adjustment coefficient, In is the rated current value at the output end of the converter circuit, and Un is the rated voltage value at the output end of the converter circuit. Herein, the system may determine the first high voltage ride-through current value based on the third operating current value, a difference between the second trigger voltage value and the fifth operating voltage value, and a ratio of the rated voltage at the output end of the converter circuit, in combination with the ride-through current adjustment coefficient and the rated current value at the output end of the converter circuit. A calculation method is simple, diverse, and flexible, so that a response speed, accuracy, and applicability of the system are improved.

DESCRIPTION OF EMBODIMENTS

A power supply system and a conversion method provided in this application are applicable to a plurality of application fields such as the field of new energy smart microgrids, the field of power transmission and distribution, the field of new energy (for example, the field of grid-tied photovoltaic energy, the field of grid-tied thermal energy, or the field of grid-tied wind energy), the field of photovoltaic power generation, the field of wind power generation, the field of thermal power generation, or the field of high-power converters (for example, a direct current is converted into a high-power alternating current). This may be determined based on an actual application scenario, and is not limited herein.

Figure 1:
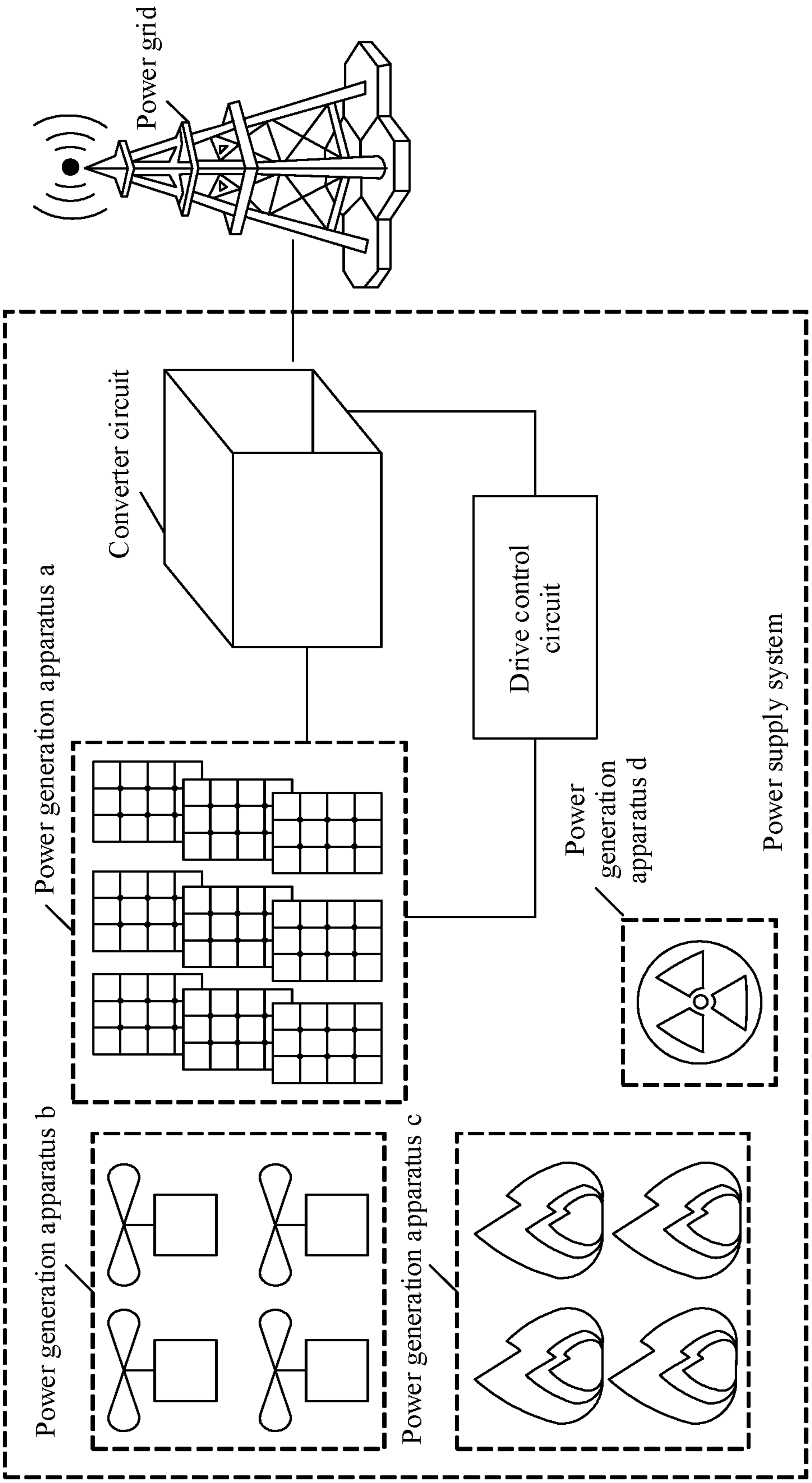
FIG. 1 is a schematic diagram of an application scenario of a power supply system according to this application.

The power supply system and the conversion method provided in this application are applicable to a power supply system with different power generation apparatuses, such as a photovoltaic power supply system, a wind power supply system, a thermal power supply system, a nuclear power supply system, a chemical power supply system, or a biomass power supply system. This may be determined based on an actual application scenario, and is not limited herein. FIG. 1 is a schematic diagram of an application scenario of a power supply system according to this application. As shown in FIG. 1, the power supply system may include a power generation apparatus, a converter circuit, and a drive control circuit. The power generation apparatus may be connected to an input end of the converter circuit, an output end of the converter circuit may be connected to a power grid, and the drive control circuit may be connected to the converter circuit. The power generation apparatus may be a photovoltaic power generation apparatus (a power generation apparatus a shown in FIG. 1), a wind power generation apparatus (a power generation apparatus b shown in FIG. 1), a thermal power generation apparatus (a power generation apparatus c shown in FIG. 1), a nuclear power generation apparatus (a power generation apparatus d shown in FIG. 1), a chemical power generation apparatus (not shown in FIG. 1), a biomass power generation apparatus (not shown in FIG. 1), or the like. For ease of description, the photovoltaic power generation apparatus is used below as an example for description. The converter circuit and the drive control circuit may be integrated into a converter or another apparatus (not shown in FIG. 1) with a converter function. When the power supply system operates normally, the converter circuit may adjust an output current to adjust a voltage value at the output end of the converter circuit to a voltage value that enables the power grid to operate normally, so as to supply electric energy generated by the power generation apparatus to the power grid. When the power supply system transmits electric energy to the power grid, some failures may occur in the power grid (for example, an inductive or capacitive short circuit to ground occurs in a part of the power grid (for example, some transmission cables or other elements)), causing a voltage drop (or rise) at the output end of the converter circuit. When the voltage value at the output end of the converter circuit decreases (or increases) to be less than (or greater than) a specific threshold, the converter circuit may increase (or decrease) an output reactive current to increase (or decrease) the voltage value at the output end of the converter circuit to a voltage value capable of maintaining operation of the power grid. This process may be referred to as a voltage ride-through process (herein, the voltage ride-through includes low voltage ride-through or high voltage ride-through). In this case, the drive control circuit may control, based on duration of previous voltage ride-through (to be specific, duration of previous voltage ride-through performed by the power supply system before a current moment), the converter circuit to increase (or decrease) a value of a current to be output to the power grid from an operating current value to a voltage ride-through current value, so as to increase (or decrease) the voltage value at the output end of the converter circuit. Herein, the previous voltage ride-through is latest voltage ride-through. For example, previous low voltage ride-through is latest low voltage ride-through, and previous high voltage ride-through is latest high voltage ride-through. The power supply system may control, based on the duration of the previous voltage ride-through, the current to be output by the converter circuit to the power grid, to reduce circuit oscillation, with a simple structure, a simple control method, and high safety. It can be understood that the power supply system and the conversion method provided in this application are applicable to different application scenarios, for example, a photovoltaic power supply scenario, a wind power supply scenario, a thermal power supply scenario, or another application scenario. The photovoltaic power supply scenario is used below as an example for description, and details are not described below again.

The following describes the power supply system and the conversion method provided in this application by using examples with reference to FIG. 2 to FIG. 8A and FIG. 8B.

Figure 2:
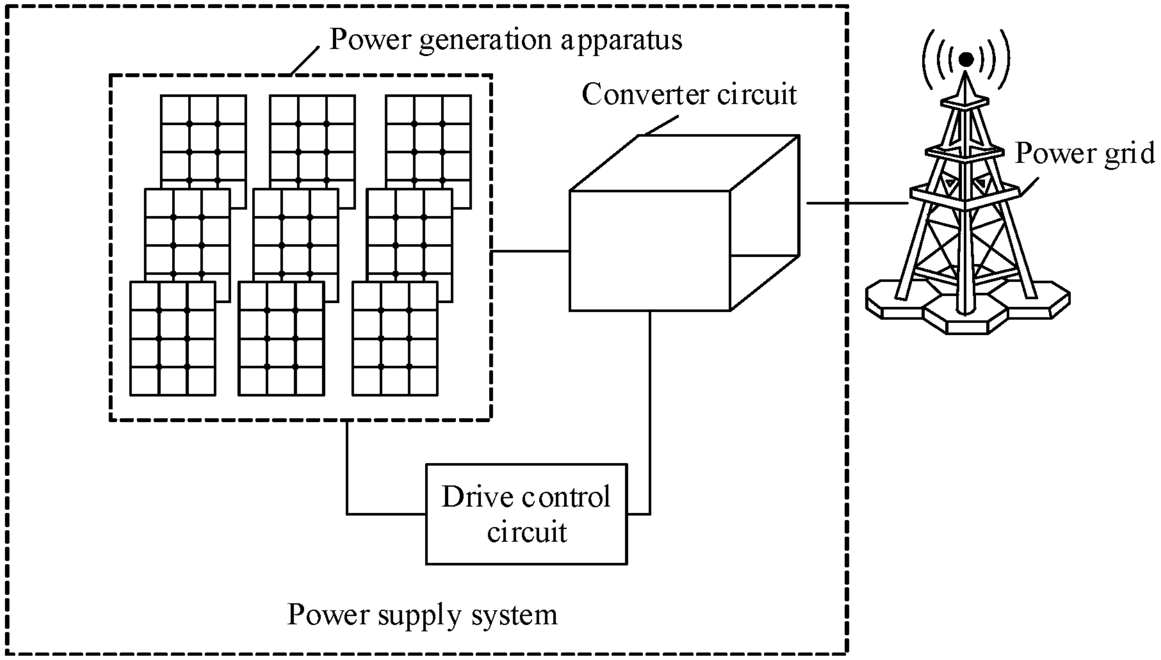
FIG. 2 is a schematic diagram of a structure of a power supply system according to this application.

FIG. 2 is a schematic diagram of a structure of a power supply system according to this application. In the power supply system shown in FIG. 2, the power generation apparatus may be a photovoltaic power generation apparatus including a photovoltaic array. The photovoltaic array herein may be a photovoltaic module group. One photovoltaic module group may include one photovoltaic string or a plurality of photovoltaic strings connected in parallel. One photovoltaic string may include one photovoltaic module or a plurality of photovoltaic modules connected in series. The photovoltaic module herein may be a solar panel, a photovoltaic panel, or the like. In other words, in the power supply system shown in FIG. 2, one photovoltaic string may be a photovoltaic string including one solar panel, photovoltaic panel, or energy storage battery, or a plurality of solar panels, photovoltaic panels, or energy storage batteries connected in series. Optionally, the power generation apparatus provided in this application may alternatively be another photovoltaic power generation apparatus or another apparatus with a power generation function. In other words, in the power supply system shown in FIG. 2, the photovoltaic array may be connected as required in an actual application scenario. For ease of description, the power supply system shown in FIG. 2 is used below as an example for description, and details are not described below again. In the power supply system shown in FIG. 2, output currents of a plurality of photovoltaic strings may supply electric energy to a power grid through a converter circuit and a drive control circuit. The power grid herein may include an electric device or a power transmission device such as a transmission cable, a power transfer station, a battery, a communication base station, or a home device.

In the power supply system shown in FIG. 2, the power supply system may include a power generation apparatus, a converter circuit, and a drive control circuit. The power generation apparatus may be connected to an input end of the converter circuit, an output end of the converter circuit may be connected to the power grid, and the drive control circuit may be connected to the converter circuit. When the power supply system operates normally, the converter circuit may adjust an output current to adjust a voltage value at the output end of the converter circuit to a voltage value that enables the power grid to operate normally, so as to supply electric energy generated by the power generation apparatus to the power grid. When the power supply system transmits electric energy to the power grid, some failures may occur in the power grid (for example, an inductive or capacitive short circuit to ground occurs in a part of the power grid (for example, some transmission cables or other elements)), causing a voltage drop (or rise) at the output end of the converter circuit. When the voltage value at the output end of the converter circuit decreases (or increases) to be less than a specific threshold, the converter circuit may increase (or decrease) an output reactive current to increase (or decrease) the voltage value at the output end of the converter circuit to a voltage value capable of maintaining operation of the power grid. This process may be referred to as a voltage ride-through process (herein, the voltage ride-through includes low voltage ride-through or high voltage ride-through). In this case, the drive control circuit may control, based on duration of previous voltage ride-through (to be specific, duration of previous voltage ride-through performed by the power supply system before a current moment), the converter circuit to increase (or decrease) a value of a current to be output to the power grid from an operating current value to a voltage ride-through current value, so as to increase (or decrease) the voltage value at the output end of the converter circuit to maintain operation of the power grid. Herein, the previous voltage ride-through is latest voltage ride-through. For example, previous low voltage ride-through is latest low voltage ride-through, and previous high voltage ride-through is latest high voltage ride-through.

In some feasible implementations, the converter circuit may be configured to determine that the power grid fails when it is detected that the voltage value at the output end of the converter circuit decreases from a first operating voltage value to a second operating voltage value, and the second operating voltage value is less than a first trigger voltage value. It can be understood that, when the power supply system transmits electric energy to the power grid, some failures may occur in the power grid (for example, an inductive short circuit to ground occurs in a part of the power grid (for example, some transmission cables or other elements)), causing a voltage drop at the output end of the converter circuit. When the voltage value at the output end of the converter circuit decreases to be less than a specific threshold (for example, the voltage value at the output end of the converter circuit decreases from the first operating voltage value to the second operating voltage value, and the second operating voltage value is less than the first trigger voltage value), the system may determine that the power grid fails, and then perform corresponding adjustment (for example, perform low voltage ride-through), to maintain operation of the power grid. This failure determining method is simple and efficient, and has a timely response and high operation efficiency, so that safety of the system is improved.

In some feasible implementations, herein, the drive control circuit may be configured to: when the power grid fails, control, based on duration of previous low voltage ride-through, the converter circuit to increase a value of a current to be output to the power grid from a first operating current value to a low voltage ride-through current value, so as to increase a voltage value at the output end of the converter circuit. Herein, the previous low voltage ride-through is latest low voltage ride-through. It can be understood that, when the power supply system transmits electric energy to the power grid, some failures may occur in the power grid (for example, an inductive short circuit to ground occurs in a part of the power grid (for example, some transmission cables or other elements)), causing a voltage drop at the output end of the converter circuit. When the voltage value at the output end of the converter circuit decreases to be less than a specific threshold, the converter circuit may increase an output reactive current (for example, increase the value of the current to be output to the power grid from the first operating current value to the low voltage ride-through current value), to increase the voltage value at the output end of the converter circuit to a voltage value capable of maintaining operation of the power grid. This process may be referred to as a low voltage ride-through process. In this case, the drive control circuit may control, based on the duration of the previous low voltage ride-through (to be specific, duration of previous low voltage ride-through performed by the power supply system before a current moment), the converter circuit to increase the value of the current to be output to the power grid from the first operating current value to the low voltage ride-through current value, so as to increase the voltage value at the output end of the converter circuit. Herein, the previous low voltage ride-through is latest low voltage ride-through. The power supply system may control, based on the duration of the previous low voltage ride-through, the current to be output by the converter circuit to the power grid, to reduce circuit oscillation, with a simple structure, a simple control method, and high safety.

In some feasible implementations, the drive control circuit may be further configured to: when the power grid fails and the duration of the previous low voltage ride-through is greater than or equal to a low voltage ride-through time threshold, control the converter circuit to increase the value of the current to be output to the power grid from the first operating current value to a first low voltage ride-through current value, so as to increase the voltage value at the output end of the converter circuit.

It can be understood that, if the power grid fails at a current moment, and duration of previous low voltage ride-through performed by the power supply system before the current moment is greater than or equal to a specific threshold (for example, the low voltage ride-through time threshold), the drive control circuit may control the value of the current to be output by the converter circuit to be the first low voltage ride-through current value, so that the system can perform stable low voltage ride-through. Herein, the first low voltage ride-through current value may be a current value obtained by the system in advance or in real time, or may be a current value calculated by the system based on a current system parameter (for example, an operating voltage at the output end of the converter circuit, an operating current at the output end of the converter circuit, a rated voltage at the output end of the converter circuit, or a rated current at the output end of the converter circuit), or may be a current value defined by a user or a manufacturer in advance or in real time, or may be a current value determined based on a current value at the output end of the converter circuit during the previous low voltage ride-through. Herein, the low voltage ride-through time threshold may be user-defined, or may be maximum duration of low voltage ride-through that is specified in a grid-tied standard (for example, VDE-AR-N 4120 in Germany and GB/T 37408 in China) of each country or region.

In some feasible implementations, the drive control circuit may be further configured to obtain the first low voltage ride-through current value based on the first operating current value, the first operating voltage value, and the second operating voltage value. Herein, the first low voltage ride-through current value meets the following formula:

$$Iq1 = Is1 + KIn\frac{Us1 - Us2}{Un} \quad (1)$$

Iq1 is the first low voltage ride-through current value, Is1 is the first operating current value, Us1 is the first operating voltage value, Us2 is the second operating voltage value, K is a ride-through current adjustment coefficient, In is a rated current value at the output end of the converter circuit, and Un is a rated voltage value at the output end of the converter circuit. Herein, the system may determine the first low voltage ride-through current value based on the first operating current value, a difference between the first operating voltage value and the second operating voltage value, and a ratio of the rated voltage at the output end of the converter circuit, in combination with the ride-through current adjustment coefficient and the rated current value at the output end of the converter circuit. A calculation method is simple and flexible, so that a response speed, accuracy, and applicability of the system are improved.

In some feasible implementations, the drive control circuit may be further configured to obtain the first low voltage ride-through current value based on the first operating current value, the first trigger voltage value, and the second operating voltage value. Herein, the first low voltage ride-through current value meets the following formula:

$$Iq1 = Is1 + KIn\frac{Ul - Us2}{Un} \quad (2)$$

Iq1 is the first low voltage ride-through current value, Is1 is the first operating current value, Ul is the first trigger voltage value, Us2 is the second operating voltage value, K is a ride-through current adjustment coefficient, In is a rated current value at the output end of the converter circuit, and Un is a rated voltage value at the output end of the converter circuit. Herein, the system may determine the first low voltage ride-through current value based on the first operating current value, a difference between the first trigger voltage value and the second operating voltage value, and a ratio of the rated voltage at the output end of the converter circuit, in combination with the ride-through current adjustment coefficient and the rated current value at the output end of the converter circuit. A calculation method is simple, diverse, and flexible, so that a response speed, accuracy, and applicability of the system are improved.

Further, it can be understood that a magnitude of a reactive current output by the converter circuit under the control of the drive control circuit may match impedance of the power grid during the previous low voltage ride-through. This prevents a voltage at the output end of the converter circuit from increasing to an excessively high level, and the system does not stop performing low voltage ride-through due to misjudgment and therefore the voltage at the output end of the voltage converter circuit does not decrease again (for example, decrease to a voltage that indicates a failure of the power grid). If the duration of the previous low voltage ride-through is greater than or equal to a specific threshold (for example, the low voltage ride-through time threshold), it can be considered that the previous low voltage ride-through is stable. In other words, during low voltage ride-through of this time, the drive control circuit may control the value of the current to be output by the converter circuit to be the first low voltage ride-through current value, so that the power supply system performs low voltage ride-through. It can be understood that, in this case, a magnitude of a reactive current output by the converter circuit matches impedance of the power grid, so that a voltage at the output end of the converter circuit does not increase to an excessively high level. In addition, the system is prevented from stopping performing low voltage ride-through due to misjudgment, and therefore the voltage at the output end of the voltage converter circuit does not decrease again. That is, during the low voltage ride-through of this time, the drive control circuit may control the value of the current to be output by the converter circuit to be the first low voltage ride-through current value, so that the power supply system can perform stable low voltage ride-through, to reduce circuit oscillation, with a simple structure, a simple control method, a timely response, high safety, and high operation efficiency.

In some feasible implementations, the drive control circuit may be further configured to: when the power grid fails and the duration of the previous low voltage ride-through is less than the low voltage ride-through time threshold, control the converter circuit to increase the value of the current to be output to the power grid from the first operating current value to a second low voltage ride-through current value, so as to increase the voltage value at the output end of the converter circuit. Herein, the second low voltage ride-through current value is less than the first low voltage ride-through current value.

It can be understood that, if the power grid fails at a current moment, and duration of previous low voltage ride-through performed by the power supply system before the current moment is less than a specific threshold (for example, the low voltage ride-through time threshold), the drive control circuit may control the value of the current to be output by the converter circuit to be the second low voltage ride-through current value, so that the system can perform stable low voltage ride-through. Herein, the second low voltage ride-through current value is less than the first low voltage ride-through current value. Herein, the second low voltage ride-through current value may be a current value that is obtained by the system in advance or in real time and that is less than the first low voltage ride-through current value, or may be a current value that is calculated or obtained by the system based on a current parameter (for example, an operating voltage at the output end of the converter circuit, an operating current at the output end of the converter circuit, a rated voltage at the output end of the converter circuit, or a rated current at the output end of the converter circuit) and that is less than the first low voltage ride-through current value, or may be a current value that is defined by a user or a manufacturer in advance or in real time and that is less than the first low voltage ride-through current value, or may be a current value that is determined based on a current value at the output end of the converter circuit during the previous low voltage ride-through and that is less than the first low voltage ride-through current value.

Figure 3:
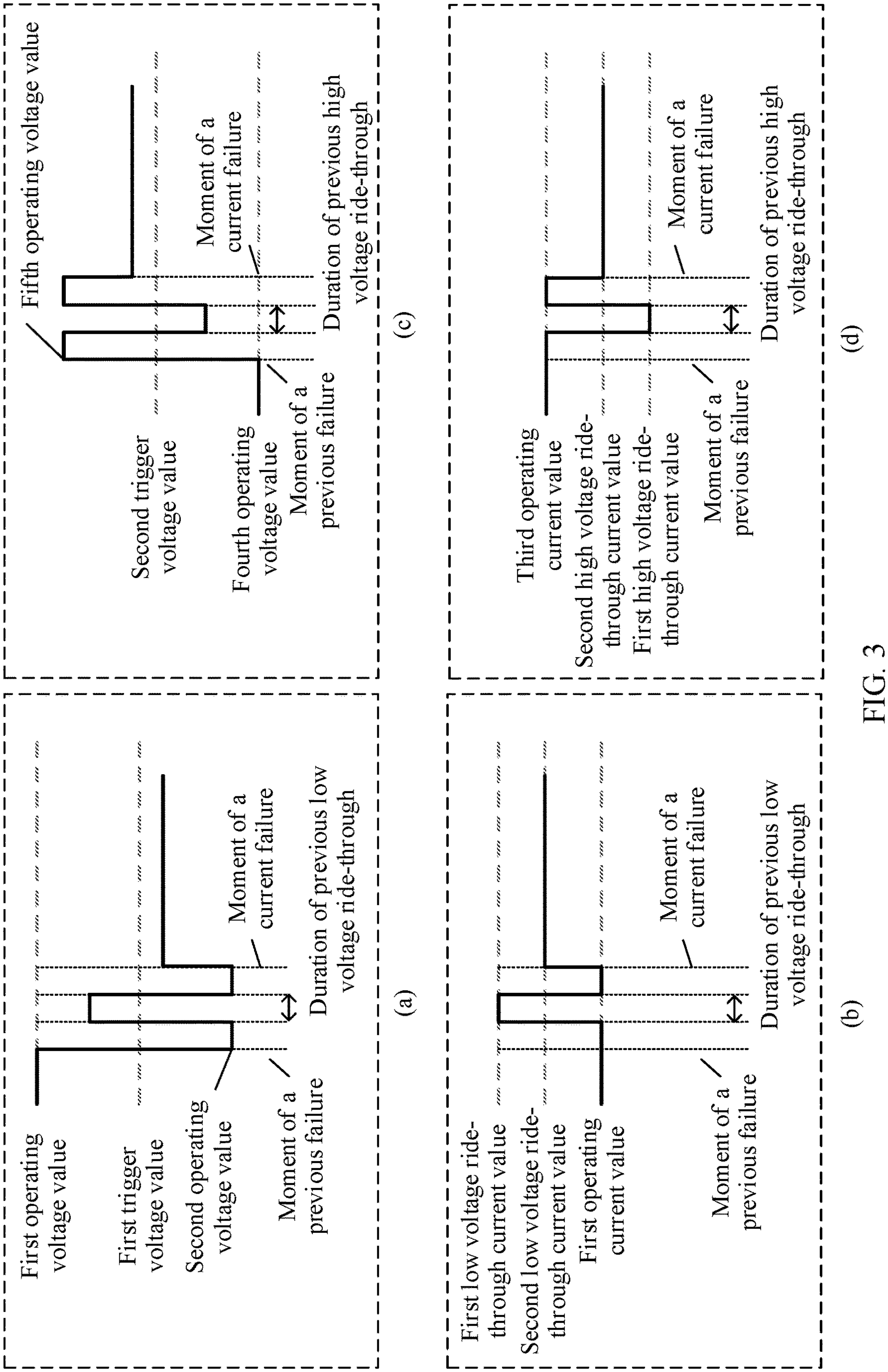
FIG. 3 is a schematic diagram of waveforms of a voltage and a current at an output end of a converter circuit according to this application.

Specifically, refer to FIG. 3. FIG. 3 is a schematic diagram of waveforms of a voltage and a current at an output end of a converter circuit according to this application. As shown in a part (a) and a part (b) in FIG. 3, it can be understood that a magnitude of a reactive current output by the converter circuit under the control of the drive control circuit may not match impedance of the power grid during the previous low voltage ride-through. As a result, a voltage at the output end of the converter circuit may increase to an excessively high level. Further, the system stops performing low voltage ride-through due to misjudgment, and therefore the voltage at the output end of the voltage converter circuit decreases again (for example, decreases to a voltage that indicates a failure of the power grid). Consequently, the duration of the previous low voltage ride-through is less than a specific threshold (for example, the low voltage ride-through time threshold). In other words, during the low voltage ride-through of this time, the drive control circuit may control the value of the current to be output by the converter circuit to be the second low voltage ride-through current value, so that the power supply system performs stable low voltage ride-through. Further, it can be understood that, in this case, a magnitude (for example, the second low voltage ride-through current value) of a reactive current output by the converter circuit matches impedance of the power grid, so that a voltage at the output end of the converter circuit does not increase to an excessively high level. In addition, the system is prevented from stopping performing low voltage ride-through due to misjudgment, and therefore the voltage at the output end of the voltage converter circuit does not decrease again. That is, during the low voltage ride-through of this time, the drive control circuit may control the value of the current to be output by the converter circuit to be the second low voltage ride-through current value, so that the power supply system can perform stable low voltage ride-through, to reduce circuit oscillation, with a simple structure, a simple control method, a timely response, high safety, and high operation efficiency.

In some feasible implementations, the drive control circuit may be further configured to: in a process in which the converter circuit increases the value of the current to be output to the power grid from the first operating current value to the low voltage ride-through current value, when it is detected that the voltage value at the output end of the converter circuit increases to a third operating voltage value, and the third operating voltage value is greater than or equal to a first recovery voltage value, obtain duration in which the converter circuit outputs the low voltage ride-through current to the power grid, and use the duration as duration of low voltage ride-through of this time. Herein, a current value of the low voltage ride-through current includes the first low voltage ride-through current value or the second low voltage ride-through current value, and the first recovery voltage value is greater than or equal to the first trigger voltage value. It can be understood that, during low voltage ride-through, if a failure in the power grid is cleared (for example, a failure point is rectified, or the power grid is disconnected in a failure area), the voltage value at the output end of the converter circuit further increases. When the voltage value at the output end of the converter circuit increases to be greater than a specific threshold (for example, the first recovery voltage value), the drive control circuit may obtain the duration in which the converter circuit outputs the low voltage ride-through current to the power grid (in other words, duration in which the system performs low voltage ride-through), and use the duration as the duration of the low voltage ride-through of this time. Herein, the duration of the low voltage ride-through of this time may be recorded and obtained by the drive control circuit, or may be recorded by another element with a timing function in the power supply system and transmitted to the drive control circuit. In this application, a method for obtaining the duration of the low voltage ride-through by the power supply system is simple, flexible, and accurate, so that a response speed and applicability of the system are improved.

In some feasible implementations, the drive control circuit may be further configured to: in a process in which the converter circuit increases the value of the current to be output to the power grid from the first operating current value to the low voltage ride-through current value, when it is detected that the voltage value at the output end of the converter circuit increases to the third operating voltage value, and the third operating voltage value is greater than or equal to the first recovery voltage value, control the converter circuit to adjust the value of the current to be output to the power grid to a second operating current value. Herein, the current value of the low voltage ride-through current includes the first low voltage ride-through current value or the second low voltage ride-through current value, the first recovery voltage value is greater than or equal to the first trigger voltage value, and the second operating current value is less than a smallest current value of the low voltage ride-through current among current values of the low voltage ride-through current. It can be understood that, during low voltage ride-through, if a failure in the power grid is cleared (for example, a failure point is rectified, or the power grid is disconnected in a failure area), the voltage value at the output end of the converter circuit further increases. When the voltage value at the output end of the converter circuit increases to be greater than a specific threshold (for example, the first recovery voltage value), the converter circuit may decrease an output reactive current, to restore the voltage value at the output end of the converter circuit to a voltage value (for example, the first operating voltage value) at the output end of the converter circuit before the failure occurs, or adjust the voltage value at the output end of the converter circuit to a voltage value suitable for operation of the power grid. That is, in the process in which the converter circuit increases the value of the current to be output to the power grid from the first operating current value to the low voltage ride-through current value, when it is detected that the voltage value at the output end of the converter circuit increases to the third operating voltage value, and the third operating voltage value is greater than or equal to the first recovery voltage value, the drive control circuit may control the converter circuit to output the second operating current value to the power grid. Herein, the second operating current value may be equal to the first operating current value. In this way, the drive control circuit can control, in a timely manner, the converter circuit to adjust a current at the output end of the converter circuit, to prevent the converter circuit from generating heat due to long-time output of a ride-through current. A control method is simple, timely, and flexible, so that a response speed, applicability, and safety of the system are improved.

In some feasible implementations, the converter circuit may be configured to determine that the power grid fails when it is detected that the voltage value at the output end of the converter circuit increases from a fourth operating voltage value to a fifth operating voltage value, and the fifth operating voltage value is greater than a second trigger voltage value. It can be understood that, when the power supply system transmits electric energy to the power grid, some failures may occur in the power grid (for example, a capacitive short circuit to ground occurs in a part of the power grid (for example, some transmission cables or other elements)), causing a voltage rise at the output end of the converter circuit. When the voltage value at the output end of the converter circuit increases to be greater than a specific threshold (for example, the voltage value at the output end of the converter circuit increases from the fourth operating voltage value to the fifth operating voltage value, and the fifth operating voltage value is greater than the second trigger voltage value), the system may determine that the power grid fails, and then perform corresponding adjustment (for example, perform high voltage ride-through), to maintain operation of the power grid. This failure determining method is simple and efficient, and has a timely response and high operation efficiency, so that safety of the system is improved.

In some feasible implementations, the drive control circuit may be further configured to: when the power grid fails, control, based on duration of previous high voltage ride-through, the converter circuit to decrease the value of the current to be output to the power grid from the third operating current value to a high voltage ride-through current value, so as to decrease the voltage value at the output end of the converter circuit. Herein, the previous high voltage ride-through is latest high voltage ride-through. It can be understood that, when the power supply system transmits electric energy to the power grid, some failures may occur in the power grid (for example, a capacitive short circuit to ground occurs in a part of the power grid (for example, some transmission cables or other elements)), causing a voltage rise at the output end of the converter circuit. When the voltage value at the output end of the converter circuit increases to be greater than a specific threshold, the converter circuit may decrease an output reactive current (for example, decrease the value of the current to be output to the power grid from the third operating current value to the high voltage ride-through current value), to decrease the voltage value at the output end of the converter circuit to a voltage value capable of maintaining operation of the power grid. This process may be referred to as a high voltage ride-through process. In this case, the drive control circuit may control, based on the duration of the previous high voltage ride-through (to be specific, duration of previous high voltage ride-through performed by the power supply system before a current moment), the converter circuit to decrease the value of the current to be output to the power grid from the third operating current value to the high voltage ride-through current value, so as to decrease the voltage value at the output end of the converter circuit. Herein, the previous high voltage ride-through is latest high voltage ride-through. The power supply system may control, based on the duration of the previous high voltage ride-through, the current to be output by the converter circuit to the power grid, to reduce circuit oscillation, with a simple structure, a simple control method, and high safety.

In some feasible implementations, the drive control circuit may be further configured to: when the power grid fails and the duration of the previous high voltage ride-through is greater than or equal to a high voltage ride-through time threshold, control the converter circuit to decrease the value of the current to be output to the power grid from the third operating current value to a first high voltage ride-through current value, so as to decrease the voltage value at the output end of the converter circuit.

It can be understood that, if the power grid fails at a current moment, and duration of previous high voltage ride-through performed by the power supply system before the current moment is greater than or equal to a specific threshold (for example, the high voltage ride-through time threshold), the drive control circuit may control the value of the current to be output by the converter circuit to be the first high voltage ride-through current value, so that the system can perform stable high voltage ride-through. Herein, the first high voltage ride-through current value may be a current value obtained in advance or in real time by the system, or may be a current value calculated by the system according to a current parameter (for example, an operating voltage of an output end of the converter circuit, an operating current at the output end of the converter circuit, a rated voltage of the output end of the converter circuit, or a rated current at the output end of the converter circuit), or may be a current value defined by a user or a manufacturer in advance or in real time, may also be a current value determined based on a current value of an output end of the converter circuit during the previous high voltage ride-through. Herein, the high voltage ride-through time threshold may be user-defined, or may be maximum duration of low voltage ride-through that is specified in a grid-tied standard (for example, VDE-AR-N 4120 in Germany and GB/T 37408 in China) of each country or region.

In some feasible implementations, the drive control circuit may be further configured to obtain the first high voltage ride-through current value based on the third operating current value, the fourth operating voltage value, and the fifth operating voltage value. Herein, the first high voltage ride-through current value meets the following formula:

$$Iq3 = Is3 + KIn\frac{Us4 - Us5}{Un} \tag{3}$$

Iq3 is the first high voltage ride-through current value, Is3 is the third operating current value, Us4 is the fourth operating voltage value, Us5 is the fifth operating voltage value, K is the ride-through current adjustment coefficient, In is the rated current value at the output end of the converter circuit, and Un is the rated voltage value at the output end of the converter circuit. Herein, operating current value, a difference between the fourth operating voltage value and the fifth operating voltage value, and a ratio of the rated voltage at the output end of the converter circuit, in combination with the ride-through current adjustment coefficient and the rated current value at the output end of the converter circuit. A calculation method is simple and flexible, so that a response speed, accuracy, and applicability of the system are improved.

In some feasible implementations, the drive control circuit may be further configured to obtain the first high voltage ride-through current value based on the third operating current value, the second trigger voltage value, and the fifth operating voltage value. Herein, the first high voltage ride-through current value meets the following formula:

$$Iq3 = Is3 + KIn\frac{Uh - Us5}{Un} \tag{4}$$

Iq3 is the first high voltage ride-through current value, Is3 is the third operating current value, Uh is the second trigger voltage value, Us5 is the fifth operating voltage value, K is the ride-through current adjustment coefficient, In is the rated current value at the output end of the converter circuit, and Un is the rated voltage value at the output end of the converter circuit. Herein, the system may determine the first high voltage ride-through current value based on the third operating current value, a difference between the second trigger voltage value and the fifth operating voltage value, and a ratio of the rated voltage at the output end of the converter circuit, in combination with the ride-through current adjustment coefficient and the rated current value at the output end of the converter circuit. A calculation method is simple, diverse, and flexible, so that a response speed, accuracy, and applicability of the system are improved.

Further, it can be understood that a magnitude of a reactive current output by the converter circuit under the control of the drive control circuit may match impedance of the power grid during the previous high voltage ride-through. This prevents a voltage at the output end of the converter circuit from decreasing to an excessively low level, and the system does not stop performing high voltage ride-through due to misjudgment and therefore the voltage at the output end of the voltage converter circuit does not increase again (for example, increase to a voltage that indicates a failure of the power grid). If the duration of the previous high voltage ride-through is greater than or equal to a specific threshold (for example, the high voltage ride-through time threshold), it can be considered that the previous high voltage ride-through is stable. In other words, during high voltage ride-through of this time, the drive control circuit may control the value of the current to be output by the converter circuit to be the first high voltage ride-through current value, so that the power supply system performs high voltage ride-through. It can be understood that, in this case, a magnitude of a reactive current output by the converter circuit matches impedance of the power grid, so that a voltage at the output end of the converter circuit does not decrease to an excessively low level. In addition, the system is prevented from stopping performing high voltage ride-through due to misjudgment, and therefore the voltage at the output end of the voltage converter circuit does not increase again. That is, during the high voltage ride-through of this time, the drive control circuit may control the value of the current to be output by the converter circuit to be the first high voltage ride-through current value, so that the power supply system can perform stable high voltage ride-through, to reduce circuit oscillation, with a simple structure, a simple control method, a timely response, high safety, and high operation efficiency.

In some feasible implementations, the drive control circuit may be further configured to: when the power grid fails and the duration of the previous high voltage ride-through is less than the high voltage ride-through time threshold, control the converter circuit to decrease the value of the current to be output to the power grid from the third operating current value to a second high voltage ride-through current value, so as to decrease the voltage value at the output end of the converter circuit. Herein, the second high voltage ride-through current value is greater than the first high voltage ride-through current value.

It can be understood that, if the power grid fails at a current moment, and duration of previous high voltage ride-through performed by the power supply system before the current moment is less than a specific threshold (for example, the high voltage ride-through time threshold), the drive control circuit may control the value of the current to be output by the converter circuit to be the second high voltage ride-through current value, so that the system can perform stable high voltage ride-through. Herein, the second high voltage ride-through current value is greater than the first high voltage ride-through current value. Herein, the second high voltage ride-through current value may be a current value that is obtained by the system in advance or in real time and that is greater than the first high voltage ride-through current value, or may be a current value that is calculated or obtained by the system based on a current parameter (for example, an operating voltage at the output end of the converter circuit, an operating current at the output end of the converter circuit, a rated voltage at the output end of the converter circuit, or a rated current at the output end of the converter circuit) and that is greater than the first high voltage ride-through current value, or may be a current value that is defined by a user or a manufacturer in advance or in real time and that is greater than the first high voltage ride-through current value, or may be a current value that is determined based on a current value at the output end of the converter circuit during the previous high voltage ride-through and that is greater than the first high voltage ride-through current value.

Specifically, refer to a part (c) and a part (d) in FIG. 3. As shown in the part (c) and the part (d) in FIG. 3, it can be understood that a magnitude of a reactive current output by the converter circuit under the control of the drive control circuit may not match impedance of the power grid during the previous high voltage ride-through. As a result, a voltage at the output end of the converter circuit may decrease to an excessively low level. Further, the system stops performing high voltage ride-through due to misjudgment, and therefore the voltage at the output end of the voltage converter circuit increases again (for example, increases to a voltage that indicates a failure of the power grid). Consequently, the duration of the previous high voltage ride-through is less than a specific threshold (for example, the high voltage ride-through time threshold). In other words, during the high voltage ride-through of this time, the drive control circuit may control the value of the current to be output by the converter circuit to be the second high voltage ride-through current value, so that the power supply system performs stable high voltage ride-through. Further, it can be understood that, in this case, a magnitude (for example, the second high voltage ride-through current value) of a reactive current output by the converter circuit matches impedance of the power grid, so that a voltage at the output end of the converter circuit does not decrease to an excessively low level. In addition, the system is prevented from stopping performing high voltage ride-through due to misjudgment, and therefore the voltage at the output end of the voltage converter circuit does not increase again. That is, during the high voltage ride-through of this time, the drive control circuit may control the value of the current to be output by the converter circuit to be the second high voltage ride-through current value, so that the power supply system can perform stable high voltage ride-through, to reduce circuit oscillation, with a simple structure, a simple control method, a timely response, high safety, and high operation efficiency.

In some feasible implementations, the drive control circuit may be further configured to: in a process in which the converter circuit decreases the value of the current to be output to the power grid from the third operating current value to the high voltage ride-through current value, when it is detected that the voltage value at the output end of the converter circuit decreases to a sixth operating voltage value, and the sixth operating voltage value is less than or equal to a second recovery voltage value, obtain duration in which the converter circuit outputs the high voltage ride-through current to the power grid, and use the duration as duration of high voltage ride-through of this time. Herein, a current value of the high voltage ride-through current includes the first high voltage ride-through current value or the second high voltage ride-through current value, and the second recovery voltage value is less than or equal to the second trigger voltage value. It can be understood that, during high voltage ride-through, if a failure in the power grid is cleared (for example, a failure point is rectified, or the power grid is disconnected in a failure area), the voltage value at the output end of the converter circuit further decreases. When the voltage value at the output end of the converter circuit decreases to be less than a specific threshold (for example, the second recovery voltage value), the drive control circuit may obtain the duration in which the converter circuit outputs the high voltage ride-through current to the power grid (in other words, duration in which the system performs high voltage ride-through), and use the duration as the duration of the high voltage ride-through of this time. Herein, the duration of the high voltage ride-through of this time may be recorded and obtained by the drive control circuit, or may be recorded by another element with a timing function in the power supply system and transmitted to the drive control circuit. In this application, a method for obtaining the duration of the high voltage ride-through by the power supply system is simple, flexible, and accurate, so that a response speed and applicability of the system are improved.

In some feasible implementations, the drive control circuit may be further configured to: in a process in which the converter circuit decreases the value of the current to be output to the power grid from the third operating current value to the high voltage ride-through current value, when it is detected that the voltage value at the output end of the converter circuit decreases to the sixth operating voltage value, and the sixth operating voltage value is less than or equal to the second recovery voltage value, control the converter circuit to adjust the value of the current to be output to the power grid to the fourth operating current value. Herein, the current value of the high voltage ride-through current includes the first high voltage ride-through current value or the second high voltage ride-through current value, the second recovery voltage value is less than or equal to the second trigger voltage value, and the fourth operating current value is greater than a largest current value of the high voltage ride-through current among current values of the high voltage ride-through current. It can be understood that, during high voltage ride-through, if a failure in the power grid is cleared (for example, a failure point is rectified, or the power grid is disconnected in a failure area), the voltage value at the output end of the converter circuit further decreases. When the voltage value at the output end of the converter circuit decreases to be less than a specific threshold (for example, the second recovery voltage value), the converter circuit may increase an output reactive current, to restore the voltage value at the output end of the converter circuit to a voltage value (for example, the fourth operating voltage value) at the output end of the converter circuit before the failure occurs, or adjust the voltage value at the output end of the converter circuit to a voltage value suitable for operation of the power grid. That is, in the process in which the converter circuit decreases the value of the current to be output to the power grid from the third operating current value to the high voltage ride-through current value, when it is detected that the voltage value at the output end of the converter circuit decreases to the sixth operating voltage value, and the sixth operating voltage value is less than or equal to the second recovery voltage value, the drive control circuit may control the converter circuit to output the fourth operating current value to the power grid. Herein, the fourth operating current value may be equal to the third operating current value. In this way, the drive control circuit can control, in a timely manner, the converter circuit to adjust a current at the output end of the converter circuit, to prevent the converter circuit from generating heat due to long-time output of a ride-through current. A control method is simple, timely, and flexible, so that a response speed, applicability, and safety of the system are improved.

Figure 4:
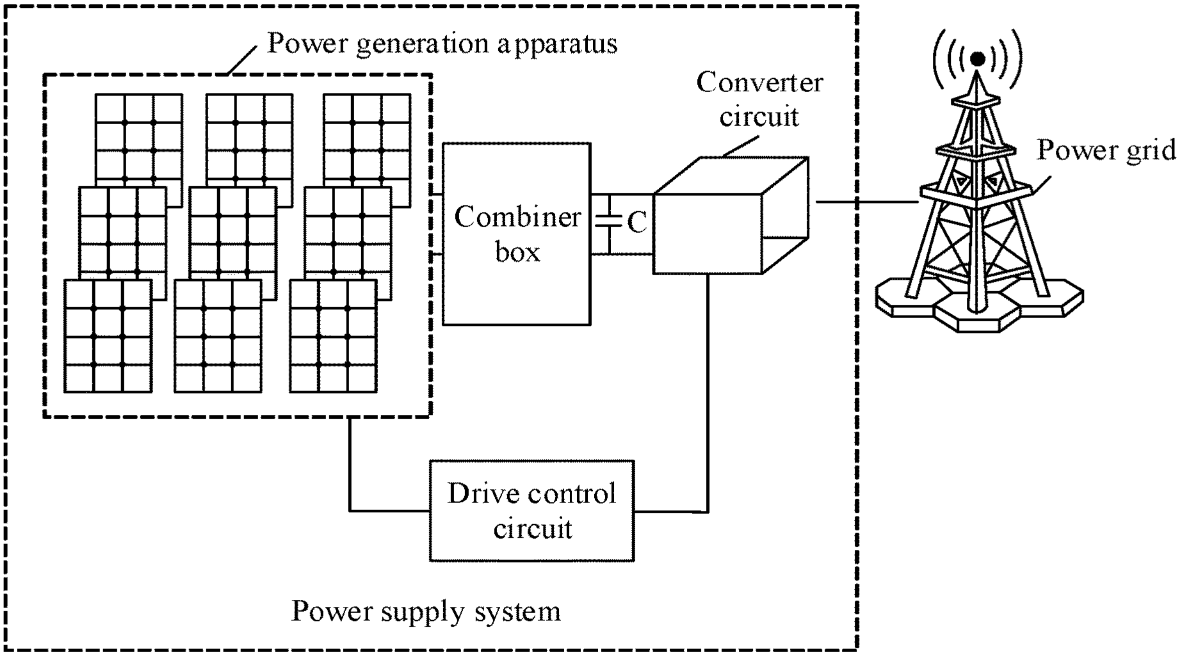
FIG. 4 is a schematic diagram of another structure of a power supply system according to this application.

FIG. 4 is a schematic diagram of another structure of a power supply system according to this application. The power supply system shown in FIG. 4 may further include a direct current bus, and the power generation apparatus may be connected to a load through the direct current bus and the converter circuit. Herein, the direct current bus may include one bus capacitor or a plurality of bus capacitors connected in series, and the bus capacitor may be configured to store energy. For example, as shown in FIG. 4, the direct current bus includes a bus capacitor C. In the power supply system shown in FIG. 4, the converter circuit may convert electric energy that is output by the power generation apparatus and that is stored at two ends of the bus capacitor C, and output a corresponding current and voltage to maintain operation of the power grid. Optionally, in some feasible implementations, as shown in FIG. 4, the power supply system may further include a combiner box, and a plurality of photovoltaic strings in the power generation apparatus may be connected in parallel to the combiner box, and are connected to the direct current bus and/or the converter circuit through the combiner box. It can be understood that the plurality of photovoltaic strings in the power generation apparatus may be connected in parallel to the combiner box and then directly connected to the converter circuit through the combiner box, or may be connected to the direct current bus through the combiner box and connected to the converter circuit through the direct current bus. This may be set based on an actual application scenario, and is not limited herein.

Figure 5:
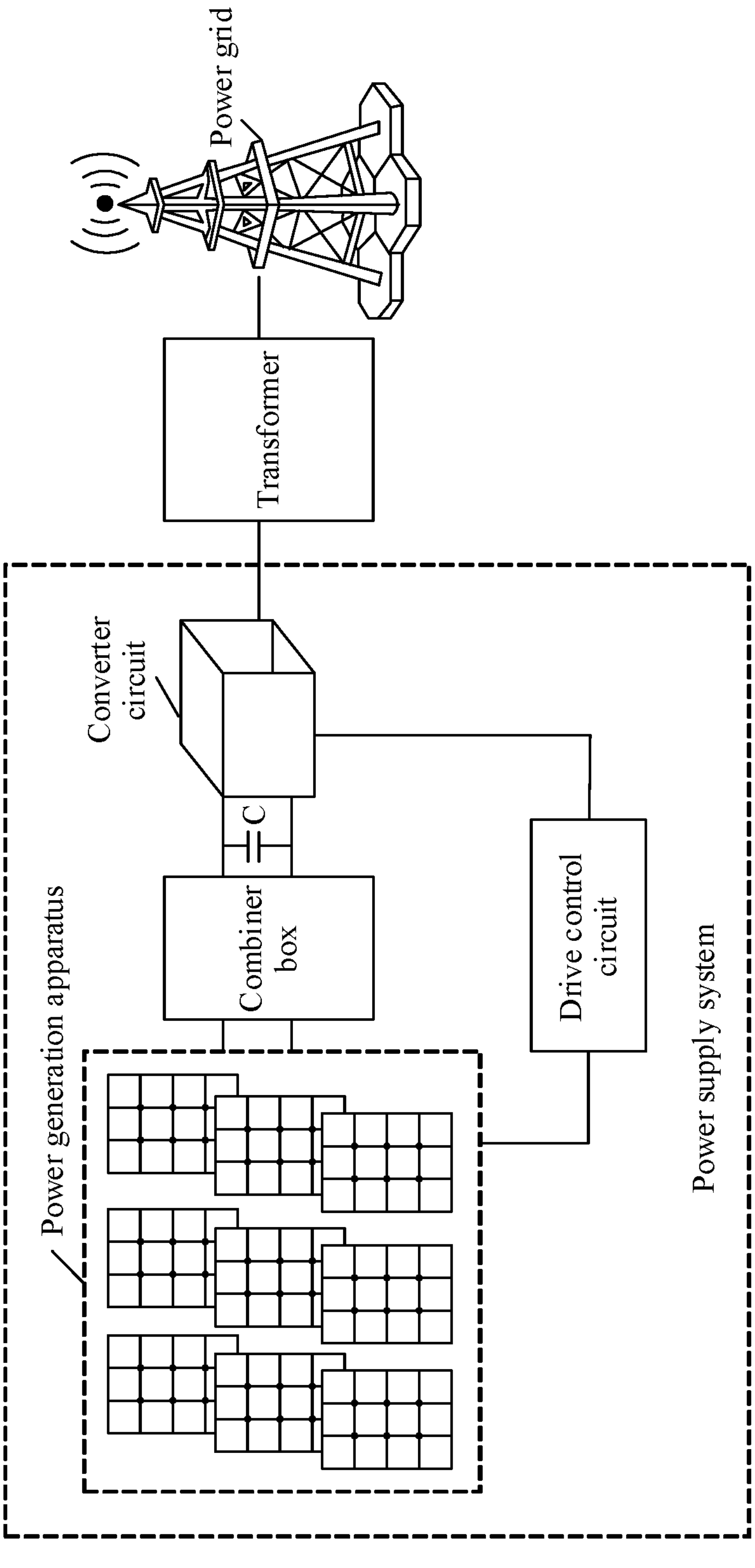
FIG. 5 is a schematic diagram of another structure of a power supply system according to this application.

FIG. 5 is a schematic diagram of another structure of a power supply system according to this application. In the power supply system shown in FIG. 5, the power generation apparatus may be connected to a direct current bus through a combiner box and connected to the converter circuit through the direct current bus, and the converter circuit is connected to the power grid through a transformer. In other words, output currents of a plurality of photovoltaic strings in the power generation apparatus may be combined by the combiner box (to be specific, the plurality of photovoltaic strings are connected in parallel to the combiner box) to provide an input voltage for the converter circuit. The converter circuit may convert electric energy that is output by the power generation apparatus and that is stored at two ends of a bus capacitor C (for example, convert direct-current electric energy into alternating-current electric energy, and preliminarily boost a voltage), and then output a corresponding current and voltage to the transformer. The transformer may further boost the voltage and transmit the voltage to the power grid to maintain operation of the power grid.

Figure 6:
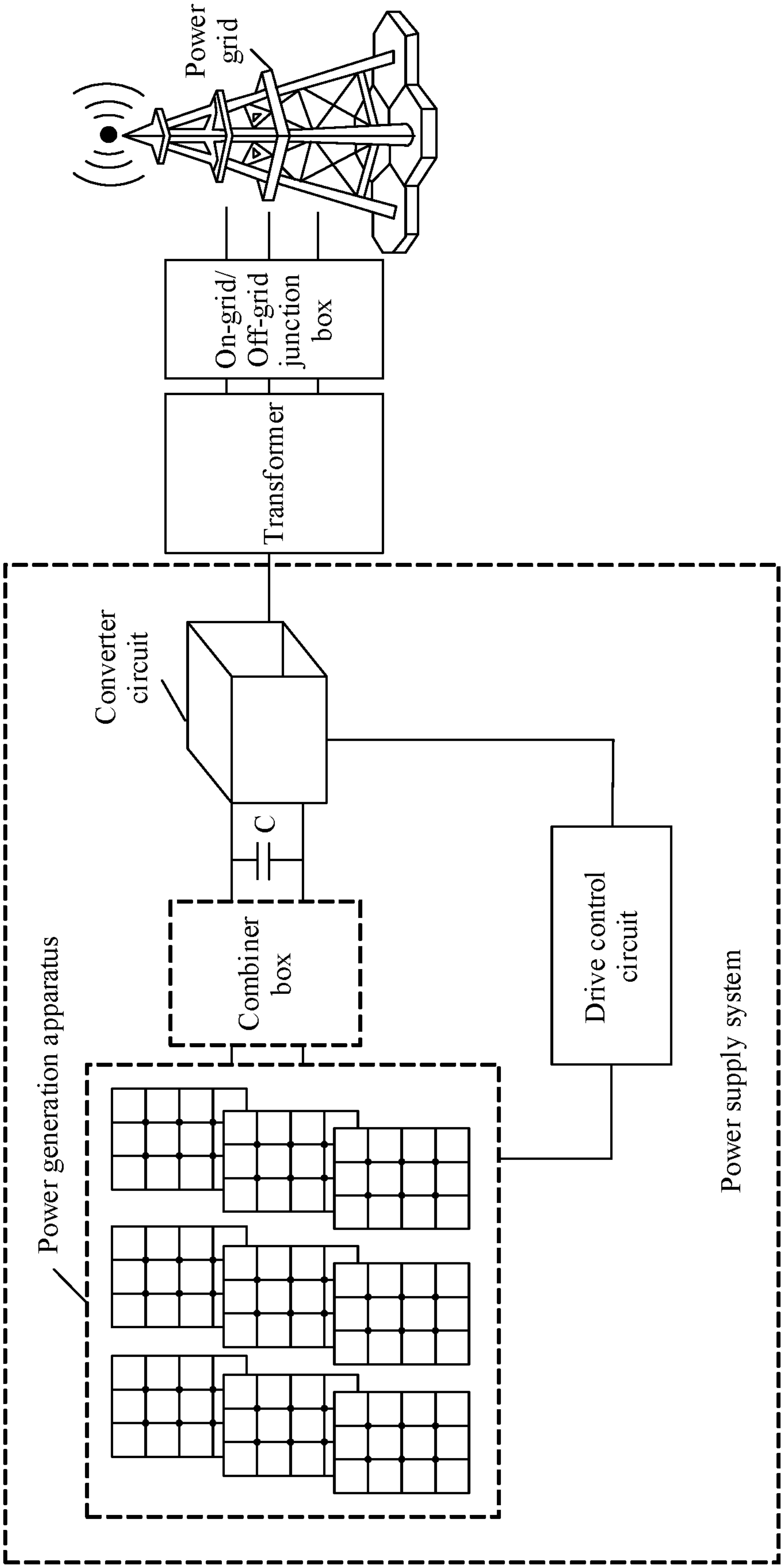
FIG. 6 is a schematic diagram of another structure of a power supply system according to this application.

FIG. 6 is a schematic diagram of another structure of a power supply system according to this application. As shown in FIG. 6, a load of the power supply system may further include an on-grid/off-grid junction box, and the converter circuit may supply power to an electric device or a power transmission device such as a transmission cable, a power transfer station, a battery, a communication base station, or a home device in the power grid through the on-grid/off-grid junction box.

In this application, the power generation apparatus in the power supply system has various representation forms, the power generation apparatus and the converter circuit are connected in flexible manners, and functional modules in the power supply system are combined in various and flexible manners, so that diversity of application scenarios of the power supply system can be improved, and adaptability of the power supply system can be improved. In addition, in any one of the power supply systems shown in FIG. 1 to FIG. 6, the power supply system may control, based on duration of previous voltage ride-through, a current to be output by the converter circuit to the power grid, to reduce circuit oscillation, with a simple structure, a simple control method, and high safety. For ease of description, the following describes a conversion method for a power supply system in embodiments of this application by using the structure of the power supply system shown in FIG. 2 as an example.

Figure 7A:
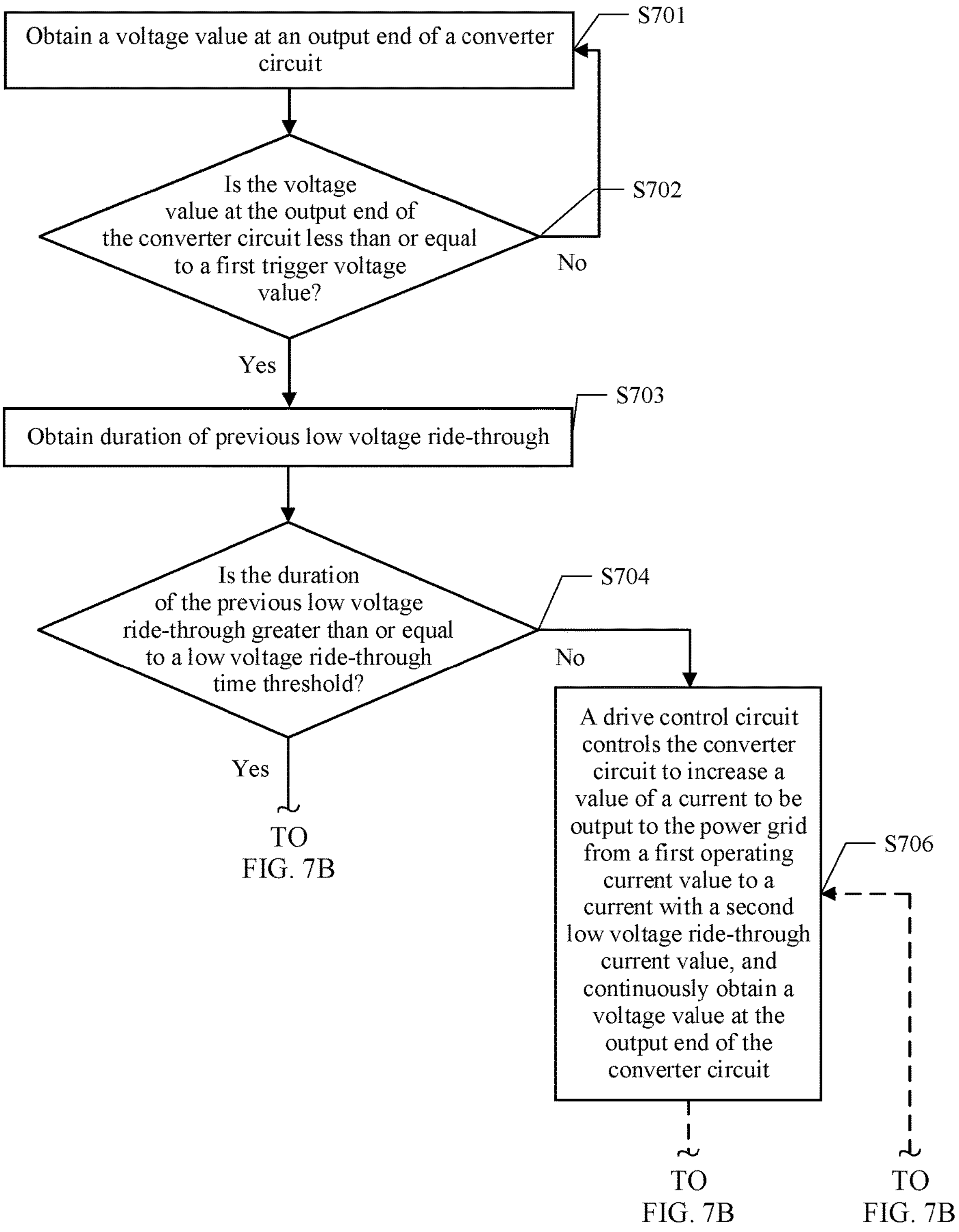
FIG. 7A and FIG. 7B are a schematic flowchart of a conversion method for a power supply system according to this application.
Figure 7B:
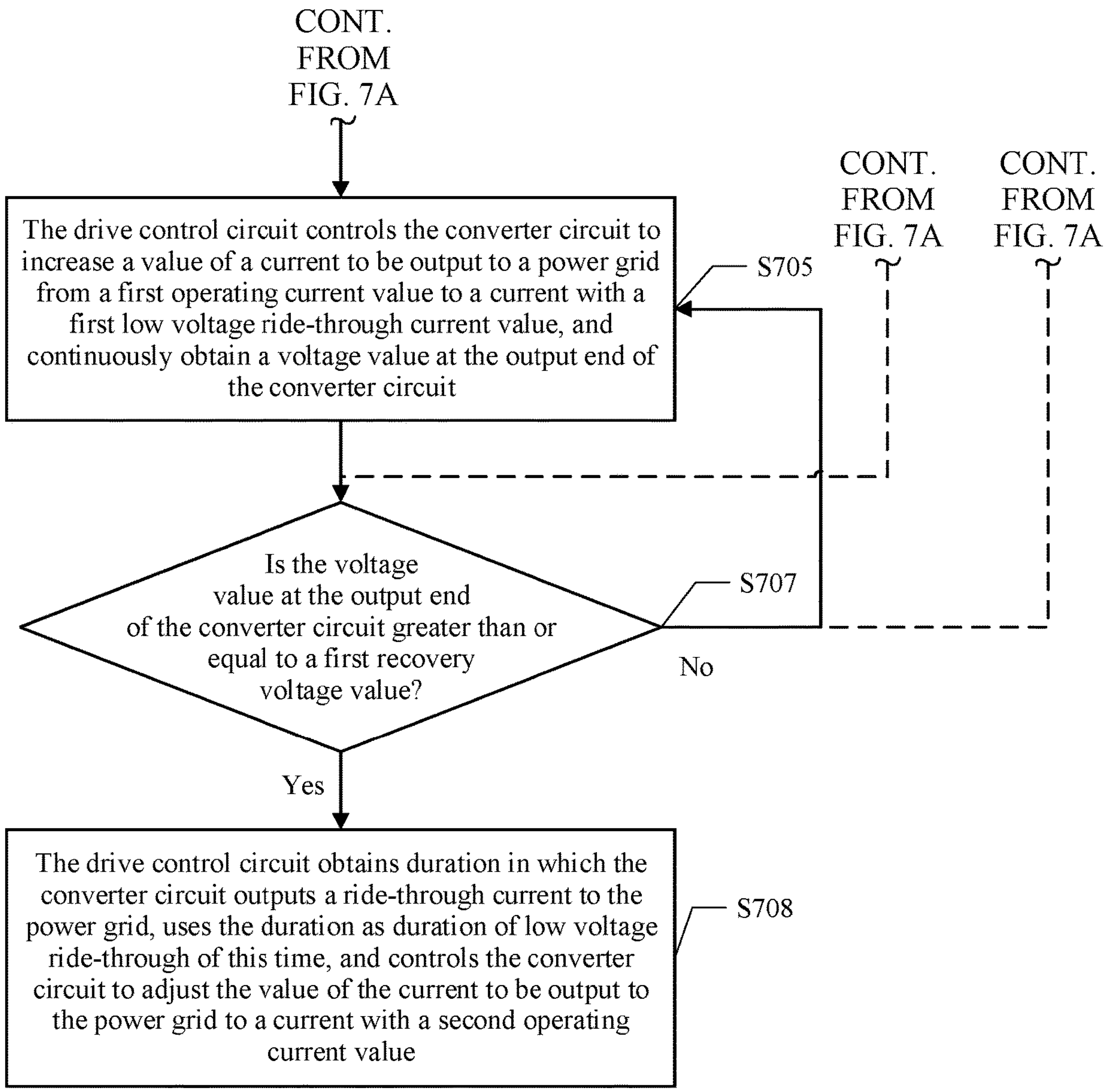

FIG. 7A and FIG. 7B are a schematic flowchart of a conversion method for a power supply system according to this application. The conversion method for a power supply system in this application is applicable to any one of the power supply systems shown in FIG. 1 to FIG. 6. As shown in FIG. 7A and FIG. 7B, the conversion method for a power supply system in this application includes the following steps.

S701: Obtain a voltage value at an output end of a converter circuit.

S702: Determine whether the voltage value at the output end of the converter circuit is less than or equal to a first trigger voltage value; and if a determining result is yes, perform step S703; or if a determining result is no, perform step S701.

In some feasible implementations, the voltage value at the output end of the converter circuit may be obtained; and when it is detected that the voltage value at the output end of the converter circuit decreases from a first operating voltage value to a second operating voltage value, and the second operating voltage value is less than the first trigger voltage value, the converter circuit determines that it is detected that an operating status of a power grid is failed. It can be understood that, when the power supply system transmits electric energy to the power grid, some failures may occur in the power grid (for example, an inductive short circuit to ground occurs in a part of the power grid (for example, some transmission cables or other elements)), causing a voltage drop at the output end of the converter circuit. When the voltage value at the output end of the converter circuit decreases to be less than a specific threshold (for example, the voltage value at the output end of the converter circuit decreases from the first operating voltage value to the second operating voltage value, and the second operating voltage value is less than the first trigger voltage value), the system may determine that the power grid fails, and then perform corresponding adjustment (for example, perform low voltage ride-through), to maintain operation of the power grid. This failure determining method is simple and efficient, and has a timely response and high operation efficiency, so that safety of the system is improved.

S703: Obtain duration of previous low voltage ride-through.

S704: Determine whether the duration of the previous low voltage ride-through is greater than or equal to a low voltage ride-through time threshold; and if a determining result is yes, perform step S705; or if a determining result is no, perform step S706.

S705: A drive control circuit controls the converter circuit to increase a value of a current to be output to the power grid from a first operating current value to a first low voltage ride-through current value, and continuously obtain a voltage value at the output end of the converter circuit.

In some feasible implementations, when it is detected that the power grid fails and the duration of the previous low voltage ride-through is greater than or equal to the low voltage ride-through time threshold, the drive control circuit controls the converter circuit to increase the value of the current to be output to the power grid from the first operating current value to the first low voltage ride-through current value, so as to increase the voltage value at the output end of the converter circuit. It can be understood that, if the power grid fails at a current moment, and duration of previous low voltage ride-through performed by the power supply system before the current moment is greater than or equal to a specific threshold (for example, the low voltage ride-through time threshold), the drive control circuit may control the value of the current to be output by the converter circuit to be the first low voltage ride-through current value, so that the system can perform stable low voltage ride-through. Herein, the first low voltage ride-through current value may be a current value obtained by the system in advance or in real time, or may be a current value calculated by the system based on a current system parameter (for example, an operating voltage at the output end of the converter circuit, an operating current at the output end of the converter circuit, a rated voltage at the output end of the converter circuit, or a rated current at the output end of the converter circuit), or may be a current value defined by a user or a manufacturer in advance or in real time, or may be a current value determined based on a current value at the output end of the converter circuit during the previous low voltage ride-through. It can be understood that a magnitude of a reactive current output by the converter circuit under the control of the drive control circuit may match impedance of the power grid during the previous low voltage ride-through. This prevents a voltage at the output end of the converter circuit from increasing to an excessively high level, and the system does not stop performing low voltage ride-through due to misjudgment and therefore the voltage at the output end of the voltage converter circuit does not decrease again (for example, decrease to a voltage that indicates a failure of the power grid). If the duration of the previous low voltage ride-through is greater than or equal to a specific threshold (for example, the low voltage ride-through time threshold), it can be considered that the previous low voltage ride-through is stable. In other words, during low voltage ride-through of this time, the drive control circuit may control the value of the current to be output by the converter circuit to be the first low voltage ride-through current value, so that the power supply system performs low voltage ride-through. It can be understood that, in this case, a magnitude of a reactive current output by the converter circuit matches impedance of the power grid, so that a voltage at the output end of the converter circuit does not increase to an excessively high level. In addition, the system is prevented from stopping performing low voltage ride-through due to misjudgment, and therefore the voltage at the output end of the voltage converter circuit does not decrease again. That is, during the low voltage ride-through of this time, the drive control circuit may control the value of the current to be output by the converter circuit to be the first low voltage ride-through current value, so that the power supply system can perform stable low voltage ride-through, to reduce circuit oscillation, with a simple structure, a simple control method, a timely response, high safety, and high operation efficiency.

In some feasible implementations, the first low voltage ride-through current value meets the following formula:

$$Iq1 = Is1 + KIn\frac{Us1 - Us2}{Un} \tag{5}$$

Iq1 is the first low voltage ride-through current value, Is1 is the first operating current value, Us1 is the first operating voltage value, Us2 is the second operating voltage value, K is a ride-through current adjustment coefficient, In is a rated current value at the output end of the converter circuit, and Un is a rated voltage value at the output end of the converter circuit. Herein, the system may determine the first low voltage ride-through current value based on the first operating current value, a difference between the first operating voltage value and the second operating voltage value, and a ratio of the rated voltage at the output end of the converter circuit, in combination with the ride-through current adjustment coefficient and the rated current value at the output end of the converter circuit. A calculation method is simple and flexible, so that a response speed, accuracy, and applicability of the system are improved.

In some feasible implementations, the first low voltage ride-through current value meets the following formula:

$$Iq1 = Is1 + KIn\frac{Ul - Us2}{Un} \quad (6)$$

Iq1 is the first low voltage ride-through current value, Is1 is the first operating current value, Ul is the first trigger voltage value, Us2 is the second operating voltage value, K is a ride-through current adjustment coefficient, In is a rated current value at the output end of the converter circuit, and Un is a rated voltage value at the output end of the converter circuit. Herein, the system may determine the first low voltage ride-through current value based on the first operating current value, a difference between the first trigger voltage value and the second operating voltage value, and a ratio of the rated voltage at the output end of the converter circuit, in combination with the ride-through current adjustment coefficient and the rated current value at the output end of the converter circuit. A calculation method is simple, diverse, and flexible, so that a response speed, accuracy, and applicability of the system are improved.

S706: The drive control circuit controls the converter circuit to increase a value of a current to be output to the power grid from a first operating current value to a second low voltage ride-through current value, and continuously obtain a voltage value at the output end of the converter circuit.

In some feasible implementations, when it is detected that the power grid fails and the duration of the previous low voltage ride-through is less than the low voltage ride-through time threshold, the drive control circuit controls the converter circuit to increase the current value of the current to be output to the power grid from the first operating current value to the second low voltage ride-through current value, so as to increase the voltage value at the output end of the converter circuit. Herein, the second low voltage ride-through current value is less than the first low voltage ride-through current value. It can be understood that, if the power grid fails at a current moment, and duration of previous low voltage ride-through performed by the power supply system before the current moment is less than a specific threshold (for example, the low voltage ride-through time threshold), the drive control circuit may control the value of the current to be output by the converter circuit to be the second low voltage ride-through current value, so that the system can perform stable low voltage ride-through. Herein, the second low voltage ride-through current value is less than the first low voltage ride-through current value. Herein, the second low voltage ride-through current value may be a current value that is obtained by the system in advance or in real time and that is less than the first low voltage ride-through current value, or may be a current value that is calculated or obtained by the system based on a current parameter (for example, an operating voltage at the output end of the converter circuit, an operating current at the output end of the converter circuit, a rated voltage at the output end of the converter circuit, or a rated current at the output end of the converter circuit) and that is less than the first low voltage ride-through current value, or may be a current value that is defined by a user or a manufacturer in advance or in real time and that is less than the first low voltage ride-through current value, or may be a current value that is determined based on a current value at the output end of the converter circuit during the previous low voltage ride-through and that is less than the first low voltage ride-through current value. It can be understood that a magnitude of a reactive current output by the converter circuit under the control of the drive control circuit may not match impedance of the power grid during the previous low voltage ride-through. As a result, a voltage at the output end of the converter circuit may increase to an excessively high level. Further, the system stops performing low voltage ride-through due to misjudgment, and therefore the voltage at the output end of the voltage converter circuit decreases again (for example, decreases to a voltage that indicates a failure of the power grid). Consequently, the duration of the previous low voltage ride-through is less than a specific threshold (for example, the low voltage ride-through time threshold). In other words, during the low voltage ride-through of this time, the drive control circuit may control the value of the current to be output by the converter circuit to be the second low voltage ride-through current value, so that the power supply system performs stable low voltage ride-through. Further, it can be understood that, in this case, a magnitude (for example, the second low voltage ride-through current value) of a reactive current output by the converter circuit matches impedance of the power grid, so that a voltage at the output end of the converter circuit does not increase to an excessively high level. In addition, the system is prevented from stopping performing low voltage ride-through due to misjudgment, and therefore the voltage at the output end of the voltage converter circuit does not decrease again. That is, during the low voltage ride-through of this time, the drive control circuit may control the value of the current to be output by the converter circuit to be the second low voltage ride-through current value, so that the power supply system can perform stable low voltage ride-through, to reduce circuit oscillation, with a simple structure, a simple control method, a timely response, high safety, and high operation efficiency.

S707: Determine whether the voltage value at the output end of the converter circuit is greater than or equal to a first recovery voltage value; and if a determining result is yes, perform step S708; or if a determining result is no, perform step S705 or step S706 based on a current value at the output end of the converter circuit.

S708: The drive control circuit obtains duration in which the converter circuit outputs a ride-through current to the power grid, uses the duration as duration of low voltage ride-through of this time, and controls the converter circuit to adjust the value of the current to be output to the power grid to a second operating current value.

In some feasible implementations, in a process in which the converter circuit increases the value of the current to be output to the power grid from the first operating current value to the low voltage ride-through current value, when it is detected that the voltage value at the output end of the converter circuit increases to a third operating voltage value, and the third operating voltage value is greater than or equal to the first recovery voltage value, the drive control circuit obtains the duration in which the converter circuit outputs the ride-through current to the power grid, and uses the duration as the duration of the low voltage ride-through of this time. Herein, a current value of the low voltage ride-through current includes the first low voltage ride-through current value or the second low voltage ride-through current value, and the first recovery voltage value is greater than or equal to the first trigger voltage value. It can be understood that, during low voltage ride-through, if a failure in the power grid is cleared (for example, a failure point is rectified, or the power grid is disconnected in a failure area), the voltage value at the output end of the converter circuit further increases. When the voltage value at the output end of the converter circuit increases to be greater than a specific threshold (for example, the first recovery voltage value), the drive control circuit may obtain the duration in which the converter circuit outputs the low voltage ride-through current to the power grid (in other words, duration in which the system performs low voltage ride-through), and use the duration as the duration of the low voltage ride-through of this time. Herein, the duration of the low voltage ride-through of this time may be recorded and obtained by the drive control circuit, or may be recorded by another element with a timing function in the power supply system and transmitted to the drive control circuit. In this application, a method for obtaining the duration of the low voltage ride-through by the power supply system is simple, flexible, and accurate, so that a response speed and applicability of the system are improved.

In some feasible implementations, in a process in which the converter circuit increases the value of the current to be output to the power grid from the first operating current value to the low voltage ride-through current value, when it is detected that the voltage value at the output end of the converter circuit increases to the third operating voltage value, and the third operating voltage value is greater than or equal to the first recovery voltage value, the drive control circuit controls the converter circuit to adjust the value of the current to be output to the power grid to the second operating current value. Herein, the current value of the low voltage ride-through current includes the first low voltage ride-through current value or the second low voltage ride-through current value, the first recovery voltage value is greater than or equal to the first trigger voltage value, and the second operating current value is less than a smallest current value of the low voltage ride-through current among current values of the low voltage ride-through current. It can be understood that, during low voltage ride-through, if a failure in the power grid is cleared (for example, a failure point is rectified, or the power grid is disconnected in a failure area), the voltage value at the output end of the converter circuit further increases. When the voltage value at the output end of the converter circuit increases to be greater than a specific threshold (for example, the first recovery voltage value), the converter circuit may decrease an output reactive current, to restore the voltage value at the output end of the converter circuit to a voltage value (for example, the first operating voltage value) at the output end of the converter circuit before the failure occurs, or adjust the voltage value at the output end of the converter circuit to a voltage value suitable for operation of the power grid. That is, in the process in which the converter circuit increases the value of the current to be output to the power grid from the first operating current value to the low voltage ride-through current value, when it is detected that the voltage value at the output end of the converter circuit increases to the third operating voltage value, and the third operating voltage value is greater than or equal to the first recovery voltage value, the drive control circuit may control the converter circuit to output the second operating current value to the power grid. Herein, the second operating current value may be equal to the first operating current value. In this way, the drive control circuit can control, in a timely manner, the converter circuit to adjust a current at the output end of the converter circuit, to prevent the converter circuit from generating heat due to long-time output of a ride-through current. A control method is simple, timely, and flexible, so that a response speed, applicability, and safety of the system are improved.

In this application, the power supply system may control, based on duration of previous voltage ride-through, a current to be output by the converter circuit to the power grid, to reduce circuit oscillation, with a simple structure, a simple control method, and high safety.

Figure 8A:
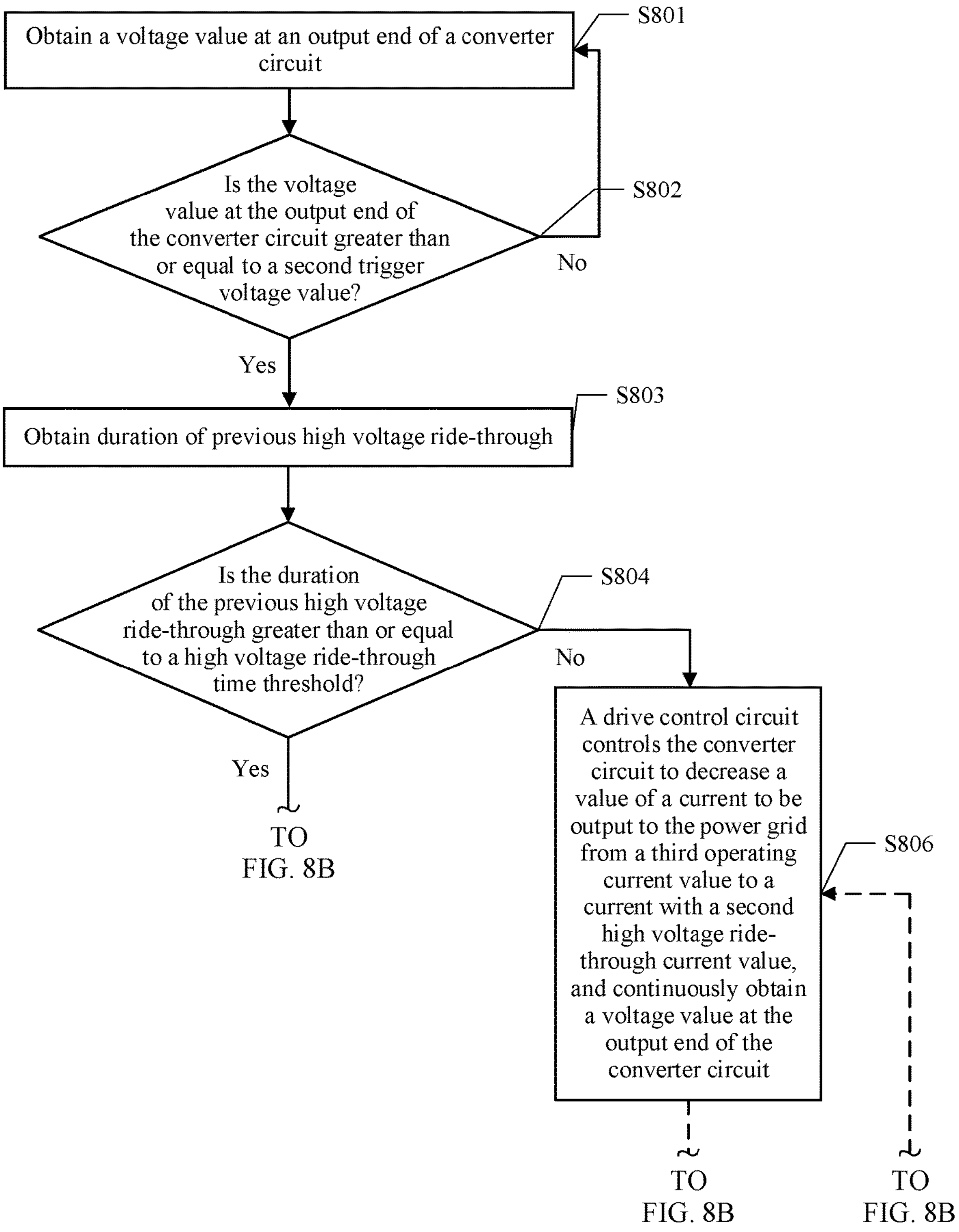
FIG. 8A and FIG. 8B are another schematic flowchart of a conversion method for a power supply system according to this application.
Figure 8B:
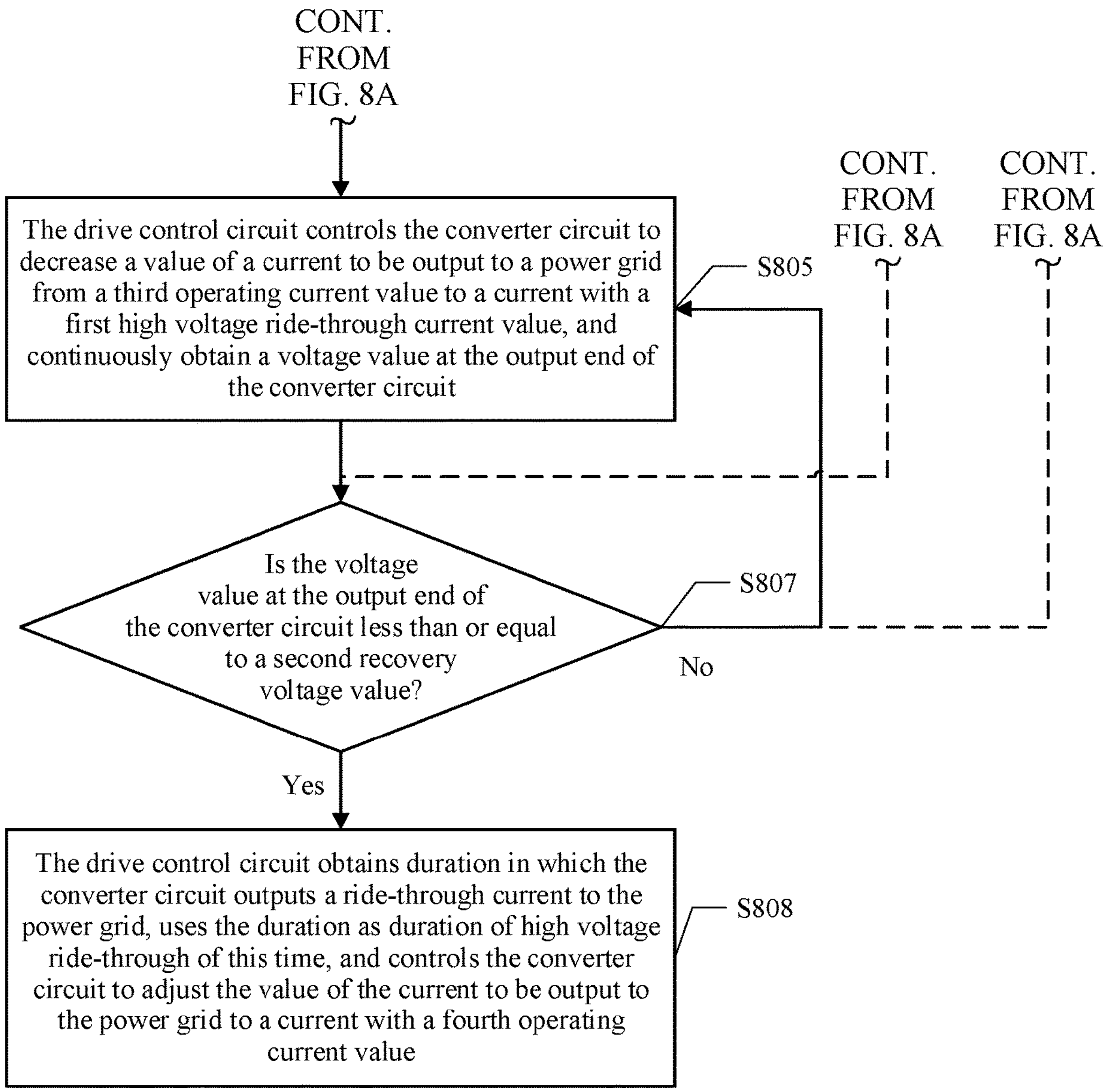

FIG. 8A and FIG. 8B are another schematic flowchart of a conversion method for a power supply system according to this application. The conversion method for a power supply system in this application is applicable to any one of the power supply systems shown in FIG. 1 to FIG. 6. As shown in FIG. 8A and FIG. 8B, the conversion method for a power supply system in this application includes the following steps.

S801: Obtain a voltage value at an output end of a converter circuit.

S802: Determine whether the voltage value at the output end of the converter circuit is greater than or equal to a second trigger voltage value; and if a determining result is yes, perform step S803; or if a determining result is no, perform step S801.

In some feasible implementations, the voltage value at the output end of the converter circuit may be obtained; and when it is detected that the voltage value at the output end of the converter circuit increases from a fourth operating voltage value to a fifth operating voltage value, and the fifth operating voltage value is greater than the second trigger voltage value, the converter circuit determines that it is detected that an operating status of a power grid is failed. It can be understood that, when the power supply system transmits electric energy to the power grid, some failures may occur in the power grid (for example, a capacitive short circuit to ground occurs in a part of the power grid (for example, some transmission cables or other elements)), causing a voltage rise at the output end of the converter circuit. When the voltage value at the output end of the converter circuit increases to be greater than a specific threshold (for example, the voltage value at the output end of the converter circuit increases from the fourth operating voltage value to the fifth operating voltage value, and the fifth operating voltage value is greater than the second trigger voltage value), the system may determine that the power grid fails, and then perform corresponding adjustment (for example, perform high voltage ride-through), to maintain operation of the power grid. This failure determining method is simple and efficient, and has a timely response and high operation efficiency, so that safety of the system is improved.

S803: Obtain duration of previous high voltage ride-through.

S804: Determine whether the duration of the previous high voltage ride-through is greater than or equal to a high voltage ride-through time threshold; and if a determining result is yes, perform step S805; or if a determining result is no, perform step S806.

S805: A drive control circuit controls the converter circuit to increase a value of a current to be output to the power grid from a third operating current value to a first high voltage ride-through current value, and continuously obtain a voltage value at the output end of the converter circuit.

In some feasible implementations, when it is detected that the power grid fails and the duration of the previous high voltage ride-through is greater than or equal to the high voltage ride-through time threshold, the drive control circuit controls the converter circuit to decrease the value of the current to be output to the power grid from the third operating current value to the first high voltage ride-through current value, so as to decrease the voltage value at the output end of the converter circuit. It can be understood that, if the power grid fails at a current moment, and duration of previous high voltage ride-through performed by the power supply system before the current moment is greater than or equal to a specific threshold (for example, the high voltage ride-through time threshold), the drive control circuit may control the value of the current to be output by the converter circuit to be the first high voltage ride-through current value, so that the system can perform stable high voltage ride-through. Herein, the first high voltage ride-through current value may be a current value obtained in advance or in real time by the system, or may be a current value calculated by the system according to a current parameter (for example, an operating voltage of an output end of the converter circuit, an operating current at the output end of the converter circuit, a rated voltage of the output end of the converter circuit, or a rated current at the output end of the converter circuit), or may be a current value defined by a user or a manufacturer in advance or in real time, may also be a current value determined based on a current value of an output end of the converter circuit during the previous high voltage ride-through.

It can be understood that a magnitude of a reactive current output by the converter circuit under the control of the drive control circuit may match impedance of the power grid during the previous high voltage ride-through. This prevents a voltage at the output end of the converter circuit from decreasing to an excessively low level, and the system does not stop performing high voltage ride-through due to misjudgment and therefore the voltage at the output end of the voltage converter circuit does not increase again (for example, increase to a voltage that indicates a failure of the power grid). If the duration of the previous high voltage ride-through is greater than or equal to a specific threshold (for example, the high voltage ride-through time threshold), it can be considered that the previous high voltage ride-through is stable. In other words, during high voltage ride-through of this time, the drive control circuit may control the value of the current to be output by the converter circuit to be the first high voltage ride-through current value, so that the power supply system performs high voltage ride-through. It can be understood that, in this case, a magnitude of a reactive current output by the converter circuit matches impedance of the power grid, so that a voltage at the output end of the converter circuit does not decrease to an excessively low level. In addition, the system is prevented from stopping performing high voltage ride-through due to misjudgment, and therefore the voltage at the output end of the voltage converter circuit does not increase again. That is, during the high voltage ride-through of this time, the drive control circuit may control the value of the current to be output by the converter circuit to be the first high voltage ride-through current value, so that the power supply system can perform stable high voltage ride-through, to reduce circuit oscillation, with a simple structure, a simple control method, a timely response, high safety, and high operation efficiency.

In some feasible implementations, the first high voltage ride-through current value meets the following formula:

$$Iq3 = Is3 + KIn\frac{Us4 - Us5}{Un} \tag{7}$$

Iq3 is the first high voltage ride-through current value, Is3 is the third operating current value, Us4 is the fourth operating voltage value, Us5 is the fifth operating voltage value, K is the ride-through current adjustment coefficient, In is the rated current value at the output end of the converter circuit, and Un is the rated voltage value at the output end of the converter circuit. Herein, operating current value, a difference between the fourth operating voltage value and the fifth operating voltage value, and a ratio of the rated voltage at the output end of the converter circuit, in combination with the ride-through current adjustment coefficient and the rated current value at the output end of the converter circuit. A calculation method is simple and flexible, so that a response speed, accuracy, and applicability of the system are improved.

In some feasible implementations, the first high voltage ride-through current value meets the following formula:

$$Iq3 = Is3 + KIn\frac{Uh - Us5}{Un} \tag{8}$$

Iq3 is the first high voltage ride-through current value, Is3 is the third operating current value, Uh is the second trigger voltage value, Us5 is the fifth operating voltage value, K is the ride-through current adjustment coefficient, In is the rated current value at the output end of the converter circuit, and Un is the rated voltage value at the output end of the converter circuit. Herein, the system may determine the first high voltage ride-through current value based on the third operating current value, a difference between the second trigger voltage value and the fifth operating voltage value, and a ratio of the rated voltage at the output end of the converter circuit, in combination with the ride-through current adjustment coefficient and the rated current value at the output end of the converter circuit. A calculation method is simple, diverse, and flexible, so that a response speed, accuracy, and applicability of the system are improved.

S806: The drive control circuit controls the converter circuit to increase a value of a current to be output to the power grid from a third operating current value to a second high voltage ride-through current value, and continuously obtain a voltage value at the output end of the converter circuit.

In some feasible implementations, when it is detected that the power grid fails and the duration of the previous high voltage ride-through is less than the high voltage ride-through time threshold, the converter circuit is controlled to decrease the value of the current to be output to the power grid from the third operating current value to the second high voltage ride-through current value, so as to decrease the voltage value at the output end of the converter circuit. Herein, the second high voltage ride-through current value is greater than the first high voltage ride-through current value. It can be understood that, if the power grid fails at a current moment, and duration of previous high voltage ride-through performed by the power supply system before the current moment is less than a specific threshold (for example, the high voltage ride-through time threshold), the drive control circuit may control the value of the current to be output by the converter circuit to be the second high voltage ride-through current value, so that the system can perform stable high voltage ride-through. Herein, the second high voltage ride-through current value is greater than the first high voltage ride-through current value. Herein, the second high voltage ride-through current value may be a current value that is obtained by the system in advance or in real time and that is greater than the first high voltage ride-through current value, or may be a current value that is calculated or obtained by the system based on a current parameter (for example, an operating voltage at the output end of the converter circuit, an operating current at the output end of the converter circuit, a rated voltage at the output end of the converter circuit, or a rated current at the output end of the converter circuit) and that is greater than the first high voltage ride-through current value, or may be a current value that is defined by a user or a manufacturer in advance or in real time and that is greater than the first high voltage ride-through current value, or may be a current value that is determined based on a current value at the output end of the converter circuit during the previous high voltage ride-through and that is greater than the first high voltage ride-through current value. It can be understood that a magnitude of a reactive current output by the converter circuit under the control of the drive control circuit may not match impedance of the power grid during the previous high voltage ride-through. As a result, a voltage at the output end of the converter circuit may decrease to an excessively low level. Further, the system stops performing high voltage ride-through due to misjudgment, and therefore the voltage at the output end of the voltage converter circuit increases again (for example, increases to a voltage that indicates a failure of the power grid). Consequently, the duration of the previous high voltage ride-through is less than a specific threshold (for example, the high voltage ride-through time threshold). In other words, during the high voltage ride-through of this time, the drive control circuit may control the value of the current to be output by the converter circuit to be the second high voltage ride-through current value, so that the power supply system performs stable high voltage ride-through. Further, it can be understood that, in this case, a magnitude (for example, the second high voltage ride-through current value) of a reactive current output by the converter circuit matches impedance of the power grid, so that a voltage at the output end of the converter circuit does not decrease to an excessively low level. In addition, the system is prevented from stopping performing high voltage ride-through due to misjudgment, and therefore the voltage at the output end of the voltage converter circuit does not increase again. That is, during the high voltage ride-through of this time, the drive control circuit may control the value of the current to be output by the converter circuit to be the second high voltage ride-through current value, so that the power supply system can perform stable high voltage ride-through, to reduce circuit oscillation, with a simple structure, a simple control method, a timely response, high safety, and high operation efficiency.

S807: Determine whether the voltage value at the output end of the converter circuit is less than or equal to a second recovery voltage value; and if a determining result is yes, perform step S808; or if a determining result is no, perform step S805 or step S806 based on a current value at the output end of the converter circuit.

S808: The drive control circuit obtains duration in which the converter circuit outputs a ride-through current to the power grid, uses the duration as duration of high voltage ride-through of this time, and controls the converter circuit to adjust the value of the current to be output to the power grid to a fourth operating current value.

In some feasible implementations, in a process in which the converter circuit decreases the value of the current to be output to the power grid from the third operating current value to the high voltage ride-through current value, when it is detected that the voltage value at the output end of the converter circuit decreases to a sixth operating voltage value, and the sixth operating voltage value is less than or equal to the second recovery voltage value, the drive control circuit obtains duration in which the converter circuit outputs a high voltage ride-through current to the power grid, and uses the duration as the duration of the high voltage ride-through of this time. Herein, a current value of the ride-through current includes the first high voltage ride-through current value or the second high voltage ride-through current value, and the second recovery voltage value is less than or equal to the second trigger voltage value. It can be understood that, during high voltage ride-through, if a failure in the power grid is cleared (for example, a failure point is rectified, or the power grid is disconnected in a failure area), the voltage value at the output end of the converter circuit further decreases. When the voltage value at the output end of the converter circuit decreases to be less than a specific threshold (for example, the second recovery voltage value), the drive control circuit may obtain the duration in which the converter circuit outputs the high voltage ride-through current to the power grid (in other words, duration in which the system performs high voltage ride-through), and use the duration as the duration of the high voltage ride-through of this time. Herein, the duration of the high voltage ride-through of this time may be recorded and obtained by the drive control circuit, or may be recorded by another element with a timing function in the power supply system and transmitted to the drive control circuit. In this application, a method for obtaining the duration of the high voltage ride-through by the power supply system is simple, flexible, and accurate, so that a response speed and applicability of the system are improved.

In some feasible implementations, in a process in which the converter circuit decreases the value of the current to be output to the power grid from the third operating current value to the high voltage ride-through current value, when it is detected that the voltage value at the output end of the converter circuit decreases to the sixth operating voltage value, and the sixth operating voltage value is less than or equal to the second recovery voltage value, the converter circuit is controlled to adjust the value of the current to be output to the power grid to the fourth operating current value. Herein, the current value of the high voltage ride-through current includes the first high voltage ride-through current value or the second high voltage ride-through current value, the second recovery voltage value is less than or equal to the second trigger voltage value, and the fourth operating current value is greater than a largest current value of the high voltage ride-through current among current values of the high voltage ride-through current. It can be understood that, during high voltage ride-through, if a failure in the power grid is cleared (for example, a failure point is rectified, or the power grid is disconnected in a failure area), the voltage value at the output end of the converter circuit further decreases. When the voltage value at the output end of the converter circuit decreases to be less than a specific threshold (for example, the second recovery voltage value), the converter circuit may increase an output reactive current, to restore the voltage value at the output end of the converter circuit to a voltage value (for example, the fourth operating voltage value) at the output end of the converter circuit before the failure occurs, or adjust the voltage value at the output end of the converter circuit to a voltage value suitable for operation of the power grid. That is, in the process in which the converter circuit decreases the value of the current to be output to the power grid from the third operating current value to the high voltage ride-through current value, when it is detected that the voltage value at the output end of the converter circuit decreases to the sixth operating voltage value, and the sixth operating voltage value is less than or equal to the second recovery voltage value, the drive control circuit may control the converter circuit to output the fourth operating current value to the power grid. Herein, the fourth operating current value may be equal to the third operating current value. In this way, the drive control circuit can control, in a timely manner, the converter circuit to adjust a current at the output end of the converter circuit, to prevent the converter circuit from generating heat due to long-time output of a ride-through current. A control method is simple, timely, and flexible, so that a response speed, applicability, and safety of the system are improved.

In this application, the power supply system may control, based on duration of previous voltage ride-through, a current to be output by the converter circuit to the power grid, to reduce circuit oscillation, with a simple structure, a simple control method, and high safety.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A power supply system, comprising a power generation apparatus, a converter circuit, and a drive control circuit, wherein the converter circuit has an input end connected to the power generation apparatus, and an output end connected to a power grid, and wherein the drive control circuit is operatively connected to the converter circuit and is configured to:

when the power grid fails, control, based on a duration of a previous low voltage ride-through, the converter circuit to increase a value of a current to be output to the power grid from a first operating current value to a low voltage ride-through current value, so as to increase a voltage value at the output end of the converter circuit, wherein the previous low voltage ride-through is a latest low voltage ride-through.

2. The power supply system of claim 1, wherein the drive control circuit is further configured to:

when the power grid fails and the duration of the previous low voltage ride-through is greater than or equal to a low voltage ride-through time threshold, control the converter circuit to increase the value of the current to be output to the power grid from the first operating current value to a first low voltage ride-through current value, so as to increase the voltage value at the output end of the converter circuit.

3. The power supply system of claim 2, wherein the drive control circuit is further configured to:

when the power grid fails and the duration of the previous low voltage ride-through is less than the low voltage ride-through time threshold, control the converter circuit to increase the value of the current to be output to the power grid from the first operating current value to a second low voltage ride-through current value, so as to increase the voltage value at the output end of the converter circuit, wherein the second low voltage ride-through current value is less than the first low voltage ride-through current value.

4. The power supply system of claim 1, wherein the converter circuit is configured to determine that the power grid fails when it is detected that the voltage value at the output end of the converter circuit decreases from a first operating voltage value to a second operating voltage value, and the second operating voltage value is less than a first trigger voltage value.

5. The power supply system of claim 1, wherein the drive control circuit is further configured to: in a process in which the converter circuit increases the value of the current to be output to the power grid from the first operating current value to the low voltage ride-through current value, when it is detected that the voltage value at the output end of the converter circuit increases to a third operating voltage value, and the third operating voltage value is greater than or equal to a first recovery voltage value, obtain duration in which the converter circuit outputs the low voltage ride-through current to the power grid, and use the duration as duration of low voltage ride-through of this time, wherein a current value of the low voltage ride-through current comprises the first low voltage ride-through current value or the second low voltage ride-through current value, and the first recovery voltage value is greater than or equal to the first trigger voltage value.

6. The power supply system of claim 1, wherein the drive control circuit is further configured to: in a process in which the converter circuit increases the value of the current to be output to the power grid from the first operating current value to the low voltage ride-through current value, when it is detected that the voltage value at the output end of the converter circuit increases to the third operating voltage value, and the third operating voltage value is greater than or equal to the first recovery voltage value, control the converter circuit to adjust the value of the current to be output to the power grid to a second operating current value, wherein the current value of the low voltage ride-through current comprises the first low voltage ride-through current value or the second low voltage ride-through current value, the first recovery voltage value is greater than or equal to the first trigger voltage value, and the second operating current value is less than a smallest current value of the low voltage ride-through current among current values of the low voltage ride-through current.

7. The power supply system of claim 1, wherein the drive control circuit is further configured to obtain the first low voltage ride-through current value based on the first operating current value, the first operating voltage value, and the second operating voltage value, wherein the first low voltage ride-through current value meets the following:

$$Iq1 = Is1 + KIn\frac{Us1 - Us2}{Un},$$

wherein

Iq1 is the first low voltage ride-through current value, Is1 is the first operating current value, Us1 is the first operating voltage value, Us2 is the second operating voltage value, K is a ride-through current adjustment coefficient, In is a rated current value at the output end of the converter circuit, and Un is a rated voltage value at the output end of the converter circuit.

8. The power supply system of claim 1, wherein the drive control circuit is further configured to obtain the first low voltage ride-through current value based on the first operating current value, the first trigger voltage value, and the second operating voltage value, wherein the first low voltage ride-through current value meets the following:

$$Iq1 = Is1 + KIn\frac{Ul - Us2}{Un},$$

wherein

Iq1 is the first low voltage ride-through current value, Is1 is the first operating current value, Ul is the first trigger voltage value, Us2 is the second operating voltage value, K is a ride-through current adjustment coefficient, In is a rated current value at the output end of the converter circuit, and Un is a rated voltage value at the output end of the converter circuit.

9. The power supply system of claim 1, wherein the drive control circuit is further configured to:

when the power grid fails, control, based on duration of previous high voltage ride-through, the converter circuit to decrease the value of the current to be output to the power grid from the third operating current value to a high voltage ride-through current value, so as to decrease the voltage value at the output end of the converter circuit, wherein the previous high voltage ride-through is latest high voltage ride-through.

10. The power supply system of claim 9, wherein the drive control circuit is further configured to:

when the power grid fails and the duration of the previous high voltage ride-through is greater than or equal to a high voltage ride-through time threshold, control the converter circuit to decrease the value of the current to be output to the power grid from the third operating current value to a first high voltage ride-through current value, so as to decrease the voltage value at the output end of the converter circuit.

11. The power supply system of claim 10, wherein the drive control circuit is further configured to: when the power grid fails and the duration of the previous high voltage ride-through is less than the high voltage ride-through time threshold, control the converter circuit to decrease the value of the current to be output to the power grid from the third operating current value to a second high voltage ride-through current value, so as to decrease the voltage value at the output end of the converter circuit, wherein the second high voltage ride-through current value is greater than the first high voltage ride-through current value.

12. The power supply system of claim 9, wherein the converter circuit is configured to determine that the power grid fails when it is detected that the voltage value at the output end of the converter circuit increases from a fourth operating voltage value to a fifth operating voltage value, and the fifth operating voltage value is greater than a second trigger voltage value.

13. The power supply system of claim 9, wherein the drive control circuit is further configured to: in a process in which the converter circuit decreases the value of the current to be output to the power grid from the third operating current value to the high voltage ride-through current value, when it is detected that the voltage value at the output end of the converter circuit decreases to a sixth operating voltage value, and the sixth operating voltage value is less than or equal to a second recovery voltage value, obtain duration in which the converter circuit outputs the high voltage ride-through current to the power grid, and use the duration as duration of high voltage ride-through of this time, wherein a current value of the high voltage ride-through current comprises the first high voltage ride-through current value or the second high voltage ride-through current value, and the second recovery voltage value is less than or equal to the second trigger voltage value.

14. The power supply system of claim 9, wherein the drive control circuit is further configured to: in a process in which the converter circuit decreases the value of the current to be output to the power grid from the third operating current value to the high voltage ride-through current value, when it is detected that the voltage value at the output end of the converter circuit decreases to the sixth operating voltage value, and the sixth operating voltage value is less than or equal to the second recovery voltage value, control the converter circuit to adjust the value of the current to be output to the power grid to the fourth operating current value, wherein the current value of the high voltage ride-through current comprises the first high voltage ride-through current value or the second high voltage ride-through current value, the second recovery voltage value is less than or equal to the second trigger voltage value, and the fourth operating current value is greater than a largest current value of the high voltage ride-through current among current values of the high voltage ride-through current.

15. The power supply system of claim 9, wherein the drive control circuit is further configured to obtain the first high voltage ride-through current value based on the third operating current value, the fourth operating voltage value, and the fifth operating voltage value, wherein the first high voltage ride-through current value meets the following:

$$Iq3 = Is3 + KIn\frac{Us4 - Us5}{Un},$$

wherein

Iq3 is the first high voltage ride-through current value, Is3 is the third operating current value, Us4 is the fourth operating voltage value, Us5 is the fifth operating voltage value, K is the ride-through current adjustment coefficient, In is the rated current value at the output end of the converter circuit, and Un is the rated voltage value at the output end of the converter circuit.

16. The power supply system of claim 9, wherein the drive control circuit is further configured to obtain the first high voltage ride-through current value based on the third operating current value, the second trigger voltage value, and the fifth operating voltage value, wherein the first high voltage ride-through current value meets the following:

$$Iq3 = Is3 + KIn\frac{Uh - Us5}{Un},$$

wherein

Iq3 is the first high voltage ride-through current value, Is3 is the third operating current value, Uh is the second trigger voltage value, Us5 is the fifth operating voltage value, K is the ride-through current adjustment coefficient, In is the rated current value at the output end of the converter circuit, and Un is the rated voltage value at the output end of the converter circuit.

17. A method for a power supply system, and the method comprises:

detecting an operating status of a power grid connected to the power supply system; and when detecting that the operating status of the power grid is failed, controlling, by a drive control circuit of the power supply system based on a duration of a previous low voltage ride-through, a converter circuit of the power supply system to increase a value of a current to be output to the power grid from a first operating current value to a low voltage ride-through current value, so as to increase a voltage value at an output end of the converter circuit, wherein the previous low voltage ride-through is a latest low voltage ride-through.

18. The method of claim 17, wherein the controlling, by the drive control circuit based on duration of previous low voltage ride-through, the converter circuit to increase the value of the current to be output to the power grid from the first operating current value to the low voltage ride-through current value comprises:

when detecting that the power grid fails and the duration of the previous low voltage ride-through is greater than or equal to a low voltage ride-through time threshold, controlling, by the drive control circuit, the converter circuit to increase the value of the current to be output to the power grid from the first operating current value to a first low voltage ride-through current value.

19. The method of claim 18, wherein the controlling, by the drive control circuit based on duration of previous low voltage ride-through, the converter circuit to increase the value of the current to be output to the power grid from the first operating current value to the low voltage ride-through current value further comprises:

when detecting that the power grid fails and the duration of the previous low voltage ride-through is less than the low voltage ride-through time threshold, controlling, by the drive control circuit, the converter circuit to increase the current value of the current to be output to the power grid from the first operating current value to a second low voltage ride-through current value, so as to increase the voltage value at the output end of the converter circuit, wherein the second low voltage ride-through current value is less than the first low voltage ride-through current value.

20. The method of claim 17, wherein the detecting the operating status of the power grid connected to the power supply system comprises:

obtaining the voltage value at the output end of the converter circuit; and when detecting that the voltage value at the output end of the converter circuit decreases from the first operating voltage value to the second operating voltage value, and the second operating voltage value is less than a first trigger voltage value, determining, by the converter circuit, that it is detected that the operating status of the power grid is failed.

* * * * *